United States Patent
Miyashita

(12)
(10) Patent No.: US 6,240,122 B1
(45) Date of Patent: May 29, 2001

(54) RECEIVING APPARATUS OF CODE SPREAD COMMUNICATION TYPE

(75) Inventor: Takumi Miyashita, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/145,288

(22) Filed: Sep. 2, 1998

Related U.S. Application Data

(63) Continuation-in-part of application No. 09/037,885, filed on Mar. 10, 1998, now abandoned.

(30) Foreign Application Priority Data

Sep. 2, 1997 (JP) ................................. 9-237228
Apr. 28, 1998 (JP) ................................. 10-118073

(51) Int. Cl.$^7$ .............................. H04J 13/02; H04J 11/00
(52) U.S. Cl. ........................................ 375/130; 370/206
(58) Field of Search .................................. 375/130, 136, 375/147; 370/203, 206, 208

(56) References Cited

U.S. PATENT DOCUMENTS

| | | | |
|---|---|---|---|
| 5,521,938 | * 5/1996 | Stewart et al. | 375/146 |
| 5,712,869 | * 1/1998 | Lee et al. | 375/206 |
| 5,724,384 | * 3/1998 | Kim et al. | 375/208 |
| 5,793,798 | * 8/1998 | Rudish et al. | 375/260 |
| 5,987,059 | * 11/1999 | Harrison et al. | 375/206 |

OTHER PUBLICATIONS

5 GHz ΣΔ Analog–to–Digital Converter with Polarity Alternating Feedback Comparator, *Ga As IC Symposium Technical Digest 1997*, Anaheim, CA (VI and pp. 91–94).

"Direct Converstion Bandpass Sigma–Delta", *Electronics Letters*, Vo. 33, No 15, Jul. 17, 1997, pp. 1282–1283.

* cited by examiner

Primary Examiner—Young T. Tse
(74) *Attorney, Agent, or Firm*—Staas & Halsey LLP

(57) ABSTRACT

According to the present invention, a receiving apparatus of a code spread communication type according to this invention includes a reception unit for receiving a transmitted signal; a demodulation signal generator for performing orthogonal modulation on a spreading code assigned to a communication channel, generating a reciprocal of a complex signal undergone the orthogonal modulation, and multiplying the reciprocal of the complex signal by a local frequency signal to generate a demodulation signal; and a first multiplier for multiplying the transmitted signal, received at the reception unit, by the demodulation signal to perform spread demodulation and orthogonal demodulation. With this structure, spread demodulation and orthogonal demodulation can be performed simultaneously by multiplying a reception signal of a high frequency by the aforementioned demodulation signal. Therefore, an analog circuit at the subsequent stage need only process a signal of a low frequency, thus making it possible to narrow the dynamic range. As the spread demodulation process is carried out by an analog circuit, a burden on a digital processing unit at the subsequent stage can be reduced.

7 Claims, 28 Drawing Sheets

EMBODIMENT OF THE RECEIVING APPARATUS

EMBODIMENT OF THE RECEIVING APPARATUS

DEMODULATION SIGNAL GENERATOR

TRANSMISSION SIDE

ANOTHER EMBODIMENT

VECTOR DIAGRAM OF
ORTHOGONALLY-MODULATED SIGNAL

VECTOR DIAGRAM OF SIGNALS 28,30
PASSED THROUGH LOW-PASS FILTERS 24,26

SECOND EMBODIMENT OF
THE RECEIVING APPARATUS

DEMODULATION SIGNAL GENERATOR

DEMODULATOR

ANOTHER SECOND EMBODIMENT OF THE RECEIVING APPARATUS

MODULATION ON TRANSMISSION END

4 SYMBOL POINTS AND 2-BIT SEQUENCE

DEMODULAITON SIGNAL

COMPARATOR

ΔAD CONVERTER

INPUT BUFFER

US 6,240,122 B1

RECEIVING APPARATUS OF CODE SPREAD COMMUNICATION TYPE

This application is a Continuation-in-Part of application Ser. No. 09/037,885, filed Mar. 10, 1998, now abandoned.

BACKGROUND OF THE INVENTION

1. Field of the Invention

The present invention relates to a receiving apparatus in a code spreading system, and, more particularly, to a receiving apparatus that has as few circuit portions as possible which process a reception signal of a high frequency band.

2. Description of the Related Art

CDMA (Code Division Multiple Access), one of spread spectrum communication systems, is receiving an attention as a communication system which can produce a greater number of channels within a limited frequency in portable telephone communication, fast data communication and so forth. In this CDMA communication system, communication between two communication units is carried out with a transmission signal spread with a specific spreading code in the frequency band of the communication channel. As a result, a signal to be communicated is in the same frequency band as other signals to be communicated, and is separated from them only by the specific spreading code. That is, a transmitted signal is subjected to spread demodulation (despreading) with a spreading code on the reception side, thereby obtaining the original transmission signal from the communication channel. The transmission signal spread with the spreading code is subjected to digital modulation such as quadrature phase shift keying and is then transmitted. The digital modulation like quadrature phase shift keying can make the frequency band of the transmission wave as narrow as possible and can reduce interference with other transmission waves on the same communication channel.

Because the code spreading process, quadrature phase shift keying and the like are all carried out with digital signals, recently, those processes are generally executed by a digital signal processor.

FIG. 7 is a diagram exemplifying a conventional receiving apparatus of a code spread communication type. In this prior art, a communication signal received at a reception antenna 1 is passed through a band-pass filter 2 to yield a signal of the frequency band of the communication channel, which is in turn amplified by a low-noise amplifier 3. A multiplier 4 multiplies the amplified signal by a signal Lo1 of a local frequency $f_L$ so that the carrier frequency $f_R$ is dropped to an intermediate frequency $f_M$. As a result, the frequency becomes $f_R-f_L$ and $f_R+f_L$, and the resultant signal is then passed through a band-pass filter 5 to yield a signal 6 of the intermediate frequency $f_M=f_R-f_L$.

Then, multipliers 7 and 8 multiply this signal by a signal whose frequency is a second local frequency Lo2 shifted by $\pi/2$, thereby accomplishing orthogonal detection (orthogonal demodulation). Specifically, a transmission signal, which has undergone orthogonal modulation on the transmission side, is multiplied by a signal having the second local frequency Lo2 shifted by $\pi/2$, thus yielding an I component signal and a Q component signal, both of intermediate frequencies. Those two component signals pass through the respective low-pass filters and are converted to digital signals by AD (Analog-to-Digital) converters 56 and 58, respectively. The digital signals are then input to a digital signal processor 70. In the digital signal processor 70, a code spread band-band signal is subjected to spread demodulation or despreading (code correlation) with a spreading code to return to the original digital signal.

According to this prior art, however, spread demodulation using a spreading code is carried out in the digital signal processor 70 at the last stage, so that the circuit up to the digital signal processor 70 should process signals of a dynamic range which include signals of other channels of the same frequency band. Particularly, the greater the multiplicity becomes by increasing the number of channels, the wider the required dynamic range and the band width of signals become. It is thus necessary to secure a sufficiently wide dynamic range for the analog circuit extending from the reception antenna 1 to the digital signal processor 70. This demands a large SN ratio.

Further, spread demodulation or despreading (code correlation) with a spreading code requires fast digital processing. In particularly, as the multiplicity gets higher, the demand for this fast digital processing is further intensified, which results in increased power dissipation of the digital signal processor 70. This is contradictory to the demand for portable communications terminals or the like to reduce power consumption due to which the operation speed of the digital signal processor cannot be made sufficiently fast.

SUMMARY OF THE INVENTION

Accordingly, it is a primary object of the present invention to provide a receiving system of a code spread communication type which need not widen the dynamic range of an analog circuit.

It is another object of this invention to provide a receiving system of a code spread communication type which does not employ digital processing in spread demodulation or despreading (code correlation) with a spreading code.

It is further object of this invention to provide a receiving apparatus of a code spread communication type which can directly perform code despreading and orthogonal demodulation on a high-frequency reception signal.

To achieve the above objects, a receiving apparatus of a code spread communication type according to this invention includes:

a reception unit for receiving a transmitted signal;
  a demodulation signal generator for performing orthogonal modulation on a spreading code assigned to a communication channel, generating a reciprocal of a complex signal having undergone the orthogonal modulation, and multiplying the reciprocal of the complex signal by a local frequency signal to generate a demodulation signal; and
  a first multiplier for multiplying the transmitted signal, received at the reception unit, by the demodulation signal to perform spread demodulation and orthogonal demodulation.

With this structure, spread demodulation and orthogonal demodulation can be performed simultaneously by multiplying a reception signal of a high frequency by the aforementioned demodulation signal. Therefore, an analog circuit at the subsequent stage need only to process a signal of a low frequency, thus making it possible to narrow the dynamic range. As the spread demodulation process is carried out by an analog circuit, a burden on a digital processing unit at the subsequent stage can be reduced.

In the above receiving apparatus, the demodulation signal generator may include:

a spreading code generating section for generating a spreading code in phase with one on a transmission side;

a serial-parallel converting section for performing serial-parallel conversion on the spreading code to convert the spreading code to a plurality of symbol points;

a reciprocal converting section for converting a complex number including an I component and a Q component of each of the converted symbol points to a reciprocal; and a second multiplier for multiplying an I component and Q component of the reciprocal by the local frequency signal whose phase is shifted by $\pi/2$.

To achieve above objects, a receiving apparatus of a code spread communication type according to this invention includes:

a receiving unit for receiving a transmitted high-frequency signal acquired by subjecting a transmission data signal to code-spreading, orthogonal modulation and then frequency modulation;

a demodulation signal generator for performing orthogonal modulation on a spreading code assigned to a communication channel, and generating a demodulation signal obtained by multiplying a complex signal undergone the orthogonal modulation or a reciprocal signal of the complex signal by a local frequency signal; and a demodulator for detecting a polarity of the reception signal received by the receiving unit in response to a phase timing of the demodulation signal and detecting the transmission data signal in accordance with the detected polarity.

According to this invention, the receiving apparatus can detect a transmission data signal of a base band by generating a demodulation signal through orthogonal modulation on a spreading code and modulation on the spreading code with a local frequency signal, as done on the transmission end, and then detecting the polarity of a received high-frequency reception signal in response to the phase timing of the demodulation signal. Therefore, code despreading (code correlation) and orthogonal demodulation can be performed simultaneously at the head portion of the high-frequency reception signal. This can significantly reduce the circuits for processing a high-frequency analog signal which are conventionally required.

In this receiving apparatus, the demodulator may include a delta analog-to-digital converter for detecting a polarity of a peak value of the reception signal in response to the phase timing of the demodulation signal, and a counter for integrating an output of the delta analog-to-digital converter.

Further, this receiving apparatus is characterized in that the delta analog-to-digital converter has an input capacitor to which the reception signal is input, a comparator connected to the input capacitor, and a feedback loop for negatively feeding an output of the comparator back to the input capacitor with a delay, the comparator detects a polarity of a sum of a feedback value of the output of the comparator and the reception signal to be input to thereby generate a binary output in response to the phase timing of the demodulation signal, and the counter counts up or down in accordance with the binary output.

The use of the delta analog-to-digital converter allows detection of the polarity of a high-frequency reception signal in response to the phase timing of a demodulation signal to be carried out through the operation of the comparator in a high sensitive range thereof.

DETAILED DESCRIPTION OF THE PREFERRED EMBODIMENTS

Preferred embodiments of the present invention will now be described with reference to the accompanying drawings. It should however be noted that those embodiments are to be considered as illustrative and not restrictive and the invention is not to be limited to the details given hereunder, but may be modified within the scope of the appended claims.

Figure 1:
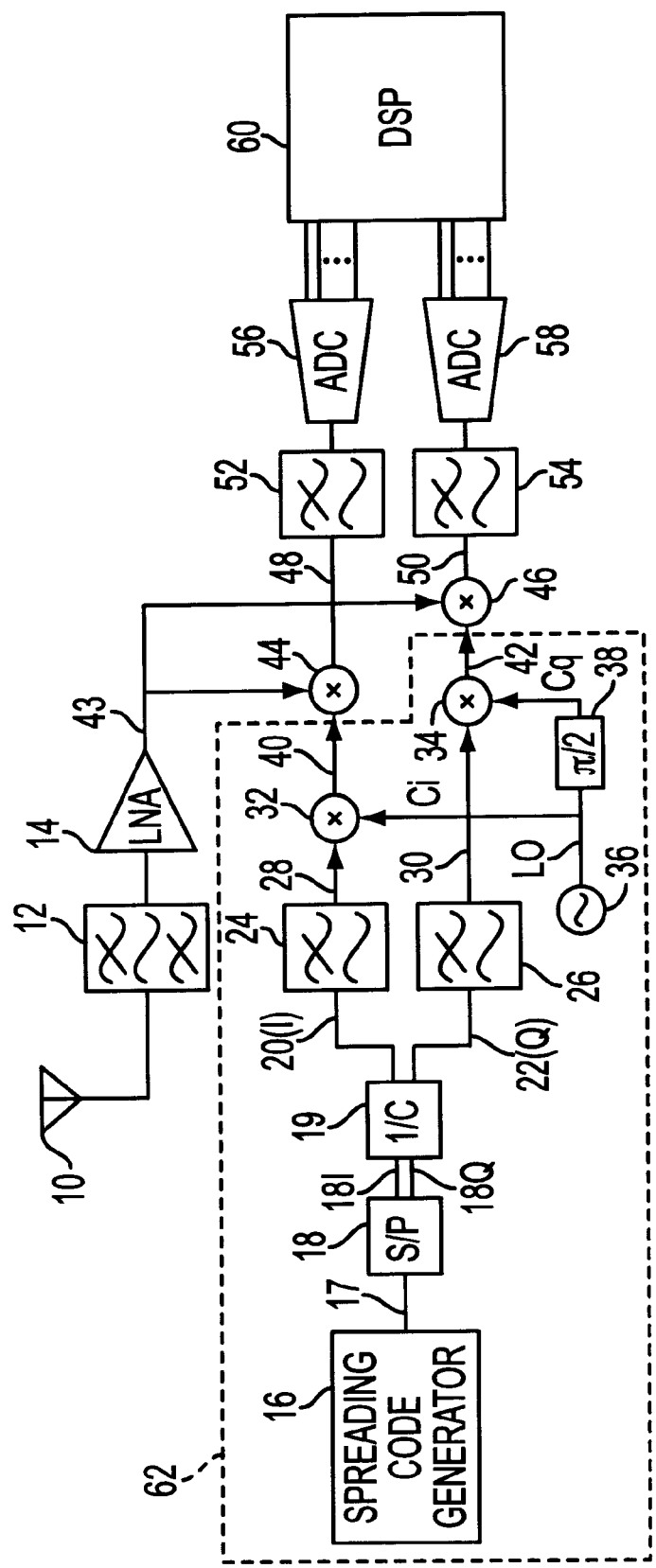
FIG. 1 is a diagram showing a receiving apparatus of a code spread communication type according to one embodiment of this invention.

FIG. 1 is a diagram showing a receiving apparatus of a code spread communication type according to one embodiment of this invention. A reception antenna 10 receives a signal of a phase shift keying wave which is acquired by performing orthogonal modulation on transmission data code spread with a spreading code. The reception signal received at the reception antenna 10 is sent to a band-pass filter 12 to remove signal components of other frequency bands than the one in use, and the resultant signal is then amplified by a low-noise amplifier 14. Therefore, an output signal 43 of the amplifier 14 is substantially the same as the received phase shift keying wave.

This signal 43 is multiplied by demodulation signals 40 and 42, which are generated by a demodulation signal generator 62, yielding an I signal 48 and a Q signal 50 of the base band which have undergone orthogonal detection and spread demodulation with a spreading code in a high-frequency circuit. After passing through low-pass filters 52 and 54 for removal of high-frequency signal which are produced by the multiplication, I signal 48 and Q signal 50 are converted to digital signals by respective AD converters 56 and 58. Then, a digital signal processor 60 performs phase mixing and parallel-serial conversion on the digital signals, thereby yielding final transmission data.

In the demodulation signal generator 62, a spreading code generator 16 generates a spreading code signal 17, which is a spreading code assigned between the transmission and reception stations and is in phase with the spreading code signal on the transmission side. This spreading code generator 16 generates the spreading code signal 17 in phase with the one on the transmission side by using the normal system such as one that detects the phase of the spreading code signal at the time when the reception signal becomes strongest while the phase is changing.

Further, a serial-parallel converter 18 in the demodulation signal generator 62 converts, for example, a sequence of two bits in the spreading code to four symbol points to produce I components 18I and Q components 18Q at the coordinates of those symbol points. This process is carried out in the same manner as orthogonal modulation.

Then, a reciprocal converter 19 produces the reciprocal of a complex number consisting of the I component 18I and Q component 18Q. An I component signal 20 and Q component signal 22 of that reciprocal pass through respective low-pass filters 24 and 26. The low-pass filters 24 and 26 are each comprised of a Nyquist filter or the like of, for example, RRCOS (Root Raised Cosine) or RCOS (Raised Cosine), and removes the high-frequency component from the signal which, as a result of the serial-parallel conversion, moves among four symbols. In other words, signal noise of the frequency that is the frequency of the signal in the periods other than the period in which the signal moves among the symbol points is removed. The low-pass filters 24 and 26 may be provided on the input side of the reciprocal converter 19.

Signals 28 and 30 which have passed through the low-pass filters 24 and 26 are multiplied in multipliers 32 and 34 by a carrier frequency signal Lo which has been produced by a local oscillator 36. As the I component signal 28 and Q component signal 30 are multiplied by the local oscillation frequency signal Lo whose phase has been shifted by π/2 by a π/2 shifter 38, an I signal 40 and a Q signal 42 are produced. Because this local oscillation frequency signal Lo has the same frequency as the carrier frequency signal of the received signal 43, multiplying the I component signal 28 and Q component signal 30 by the local oscillation frequency signal Lo produces the I signal 40 and the Q signal 42 both of the same frequency band as that of the carrier frequency signal.

Accordingly, multipliers 44 and 46 multiply the reception signal 43 by the I signal 40 and Q signal 42 or the demodulation signals, thereby producing the I signal 48 and Q signal 50 of the base band. That is, as the reception signal 43 is multiplied by the demodulation signals 40 and 42, orthogonal detection and code spread demodulation are simultaneously executed in the high-frequency circuit.

As discussed above, spread demodulation is performed by multiplying the reception signal 43 by the reciprocals of the coordinate values 18I and 18Q after conversion of the spreading code to symbol points. Assuming that the reception signal 43 is s(t), the reception signal s(t) is expressed by $$s(t)=|H(D(a+ib))e^{iwt}|.$$

where H is the characteristics of the transmission filter, D is transmission data, a+ib is a complex number denoting the coordinates of the constellation (symbol point) after serial-parallel conversion of the spreading code, and $e^{iwt}$ is the carrier frequency signal.

Thus, the demodulation signals 40 and 42, denoted by I(t), are expressed as follows.

$$I(t)=\{1/H(a+ib)\}e^{iwt}$$

Therefore, the data D to be recovered as a result of the multiplication of the reception signal s(t) by the demodulation signal I(t) by the multipliers 44 and 46 becomes $$D=Hlpf(S(t)I(t))$$

where Hlpf is the characteristics of the low-pass filters 52 and 54.

The reciprocal of a complex number is easily produced by the following equation.

$$1/c=c^*/|c|^2.$$

According to this embodiment, as discussed above, the code-spread reception signal whose frequency band is wide enough to include signals of the other channels merely passes through the band-pass filter 12 and the amplifier 14 after leaving the reception antenna 10. The low-pass filters 52 and 54, the AD converters 56 and 58, and the digital signal processor 60 at the subsequent stages have only to process signals of the data reception rate. Further, as the signals of the other channels are attenuated and removed by code spread demodulation, the dynamic ranges of those circuits need not be widened. It is also unnecessary to enhance the SN characteristic so much. Furthermore, because the digital signal processor 60 does not have to perform code spread demodulation, no fast operation is demanded of the digital signal processor 60 so that power dissipation can be suppressed.

Figure 2:
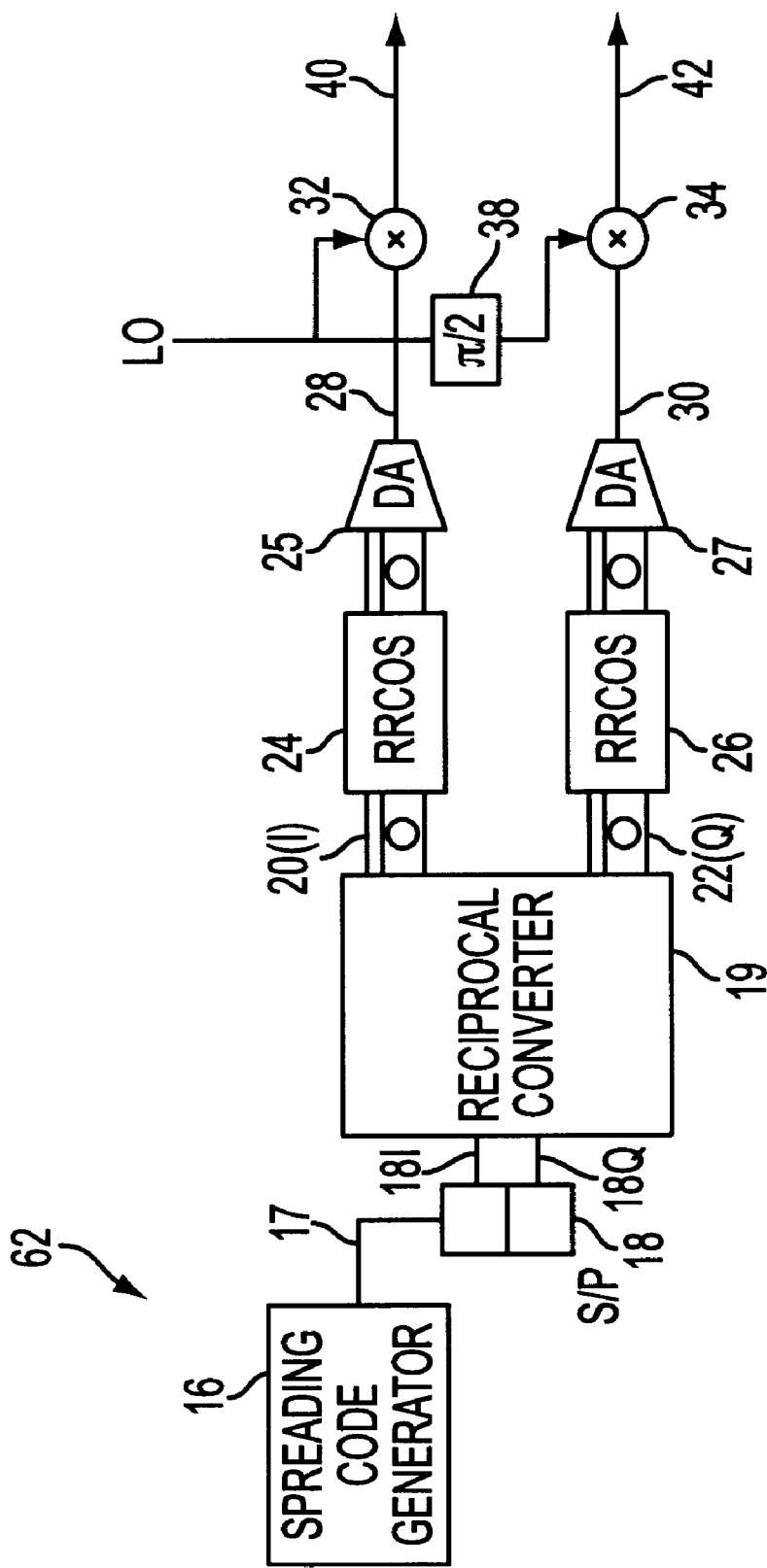
FIG. 2 is a diagram showing another example of the demodulation signal generator 62 in the above-described receiving apparatus.

FIG. 2 is a diagram showing another example of the demodulation signal generator 62 in the above-described receiving apparatus. In the drawing, same reference numerals are given to those components which are identical or corresponding to those shown in FIG. 1. In the example of FIG. 2, the spreading code generator 16 generates a high-frequency partial spreading code of a final spreading code to be used in the multiplexing process. When the spreading code is constructed by a high-frequency code A multiplied by a low-frequency code B or A×B, for example, the spreading code generator 16 produces only the high-frequency code A. The generated spreading code signal 17 is converted to parallel signals of the I component signal 18I and Q component signal 18Q in the serial-parallel converter 18. Then, the reciprocal converter 19 produces the coordinate values 20 and 22 of the reciprocal of the complex number in the form of digital values. The low-pass filters 24 and 26 are comprised of the aforementioned digital filters of RRCOS whose digital signals are in turn supplied to DA (Digital-to-Analog) converters 25 and 27 to respectively produce signals 28 and 30.

The RRCOS filters 24 and 26 have half Nyquist characteristics and removes noise in the other period than the symbol period in which the signal moves among the symbol points, in cooperation with the half Nyquist characteristics of the RRCOS filters likewise provided on the transmission side. The code correlation about the remaining code signal B in the spreading code is carried out in the digital signal processor 60 shown in FIG. 1. Because the signal has a low frequency, the code correlation process is relatively easy.

Figure 3:
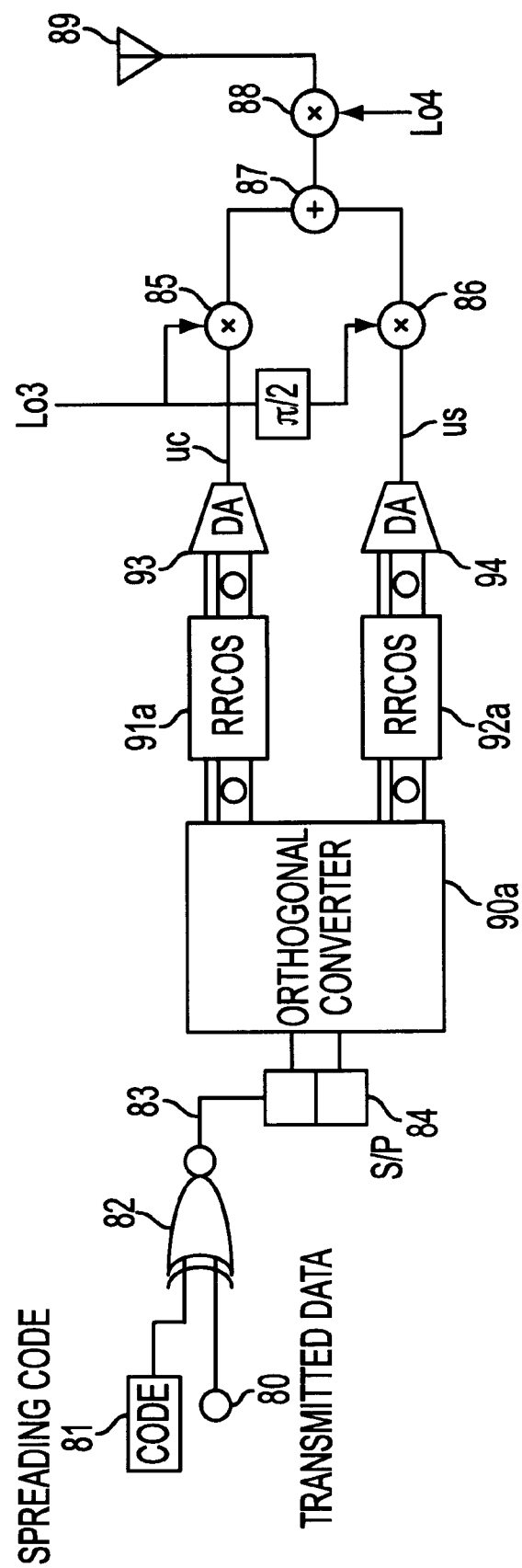
FIG. 3 is a diagram exemplifying the structure of the transmission side with respect to the above-described receiving apparatus.

FIG. 3 is a diagram exemplifying the structure of the transmission side with respect to the above-described receiving apparatus. To help understand the structure of this receiving apparatus, the structure of the transmission side will now be discussed. FIG. 3 shows a particular example of the transmission side which uses filters similar to the digital filters shown in FIG. 2.

First, code spreading is executed by mixing to-be-transmitted data 80 with a spreading code 81 specific to the transmission channel in an EOR gate 82. For the purpose of orthogonal modulation, a sequence of bits of code-spread data 83 is converted to parallel data, for example, 2-bit data to four parallel data $u_s$ and $u_c$, through a serial-parallel converter 84, an orthogonal converter 90a filters 91a and 92a and DA converters 93 and 94. Multipliers 85 and 86 multiply those data $u_s$ and $u_c$ by a signal which is a local signal Lo3 of an arbitrary intermediate frequency shifted by π/2, thereby respectively producing an I signal and Q signal. Those I signal and Q signal are added together by an added 87, and the resultant signal is multiplied by a local signal Lo4 by a multiplier 88 to further increase the carrier frequency. The resultant signal is then transmitted from a transmission antenna 89.

As apparent from the above, code spread modulation is performed on transmission data using a spreading code and then orthogonal modulation, which is digital modulation, is performed on the sequence of bits of the resultant data. What is more, low-pass filters 91a and 92a have half Nyquist characteristics similar to those of the filters 24 and 26 shown in FIG. 2, and remove noise of a frequency other than the frequency of the signal which moves among the symbol points after orthogonal conversion.

Figure 4:
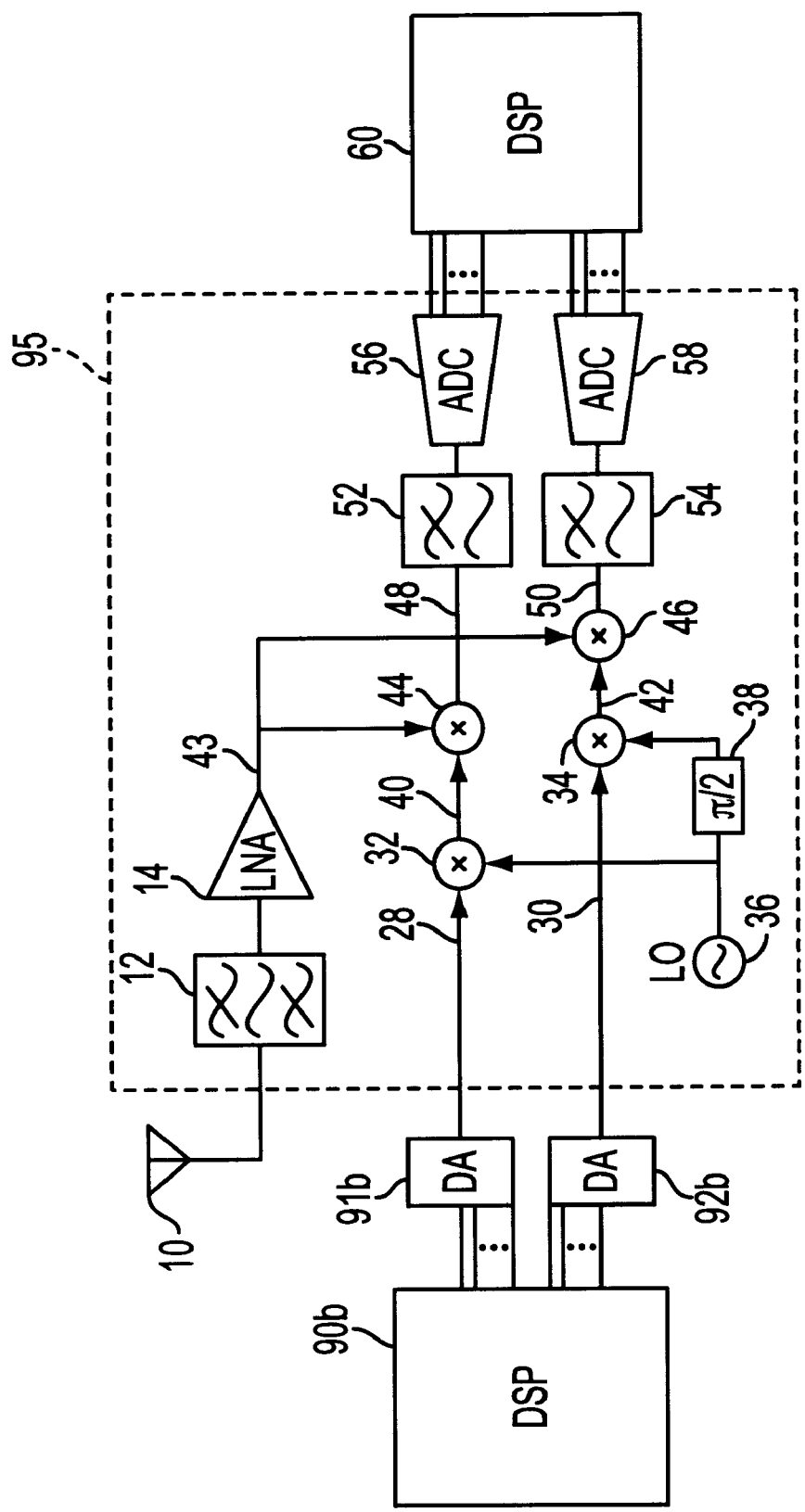
FIG. 4 is a structural diagram of a receiving apparatus according to another embodiment of this invention.

FIG. 4 is a structural diagram of a receiving apparatus according to another embodiment of this invention. Same reference numerals are given to those components which are identical or corresponding to those shown in FIG. 1. In this example, the spreading code generator 16, the serial-parallel converter 18, the reciprocal converter 19, and the low-pass filters 24 and 26 in the example in FIG. 1 are all realized in a digital signal processor 90b. The functions of those circuits are accomplished by software by the digital signal processor 90b.

The produced I component signal 28 and Q component signal 30 are converted to analog signals by DA converters 91a and 92b. Then, those signals are multiplied by a signal which is the carrier frequency signal Lo shifted by π/2, thereby producing demodulation signals 40 and 42 of the frequency band of the carrier, and the reception signal 43 is multiplied by the demodulation signals 40 and 42, as done in the circuit in FIG. 1.

It is desirable that a circuit 95 indicated by the broken line in FIG. 4 should be presented as an HEMT integrated circuit with an excellent high frequency characteristic, which uses, for example, a compound semiconductor. As a result, the receiving circuit comprises the two digital signal processors 90b and 60 and the HEMT (High Electron Mobility Transistor) integrated circuit 93 and can thus be designed compact.

According to the present invention, RF re-correlation signal r(t) can be used in place of the reciprocal signal 40, 42. That is, by multiplying the RF re-correlation signal r(t) with the received signal, we can obtain a re-correlated, quadrature demodulated, filtered and down-converted data stream. For a long spreading code sequence, it is possible to neglect the data transient effect, which is expressed by $$s(t)=d(t)|c(t)|\cos(2\pi f_c t+\angle c(t)).$$

$$r(t)=\cos(2\pi f_c t+\angle c(t)).$$

$$o(t)=s(t)r(t)$$

$$=\frac{1}{2}d(t)|c(t)|[1+\cos(4\pi f_c t+2\angle c(t))].$$

Where s(t) denotes the input RF or IF signal of carrier frequency $f_c$, d(t) denotes the received data to which a value of 1 or −1 is assigned, c(t) stands for the half-Nyquist-filtered and interpolated spreading code. The high frequency component of the output o(t) would be removed by a simple filter.

Figure 5:
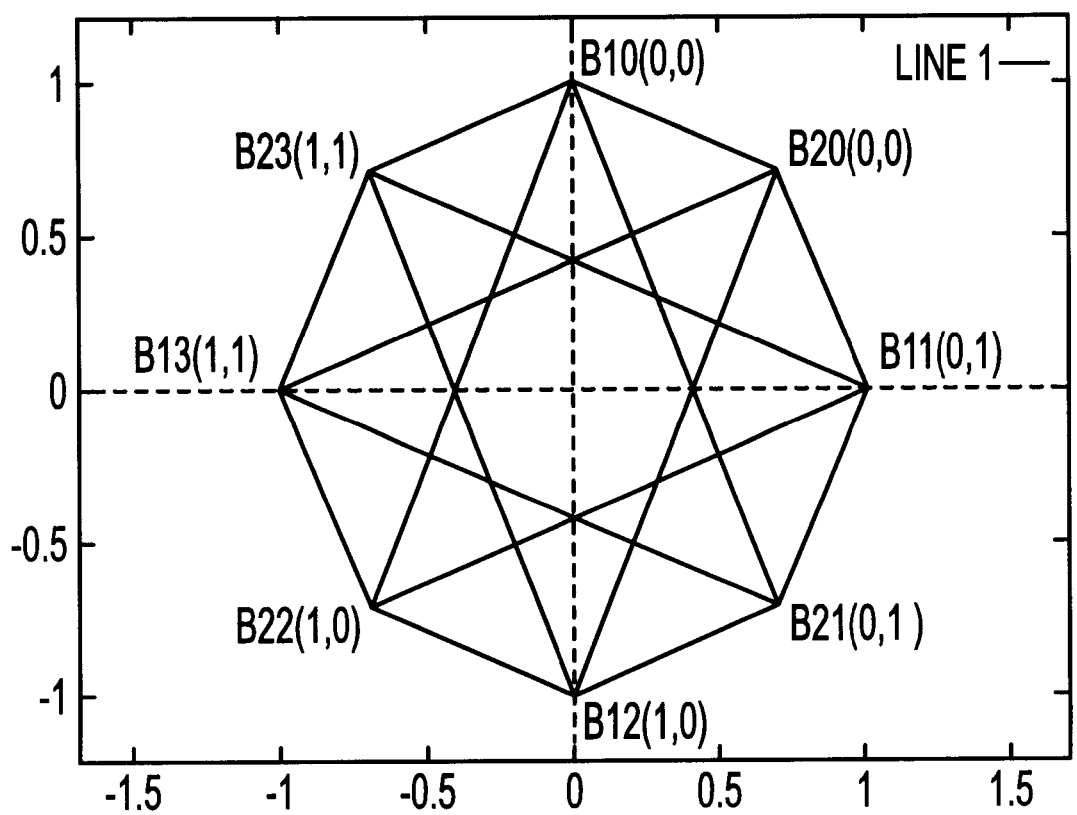
FIG. 5 is a vector diagram of an orthogonally-modulated signal.

FIG. 5 is a vector diagram of an orthogonally-modulated signal. While the carrier frequency signal Lo in the aforementioned demodulation signal generator 62 has a fixed phase, FIG. 5 shows a vector chart in the case of using the carrier frequency signal Lo whose phase is shifted by π/4 every unit time.

The spreading code 17 in FIG. 1 is alternately assigned to four symbol points $B_{10}$, $B_{11}$, $B_{12}$ and $B_{13}$, and another four symbol points $B_{20}$, $B_{21}$, $B_{22}$ and $B_{23}$ which are shifted by π/4 from the former four. That is, FIG. 5 shows the locus of an orthogonal modulation signal of DQPSK (Differential Quadrature Phase Shift Keying). As shown in this diagram, the spreading code is converted to a signal which moves among four symbol points. What is more, since this signal moves to another four symbol points shifted by π/4 from the previous four every unit time, the signal always moves among symbol points. With this design, the signal does not pass the origin during movement among the symbol points and can avoid being distorted by an amplifier or the like.

Figure 6:
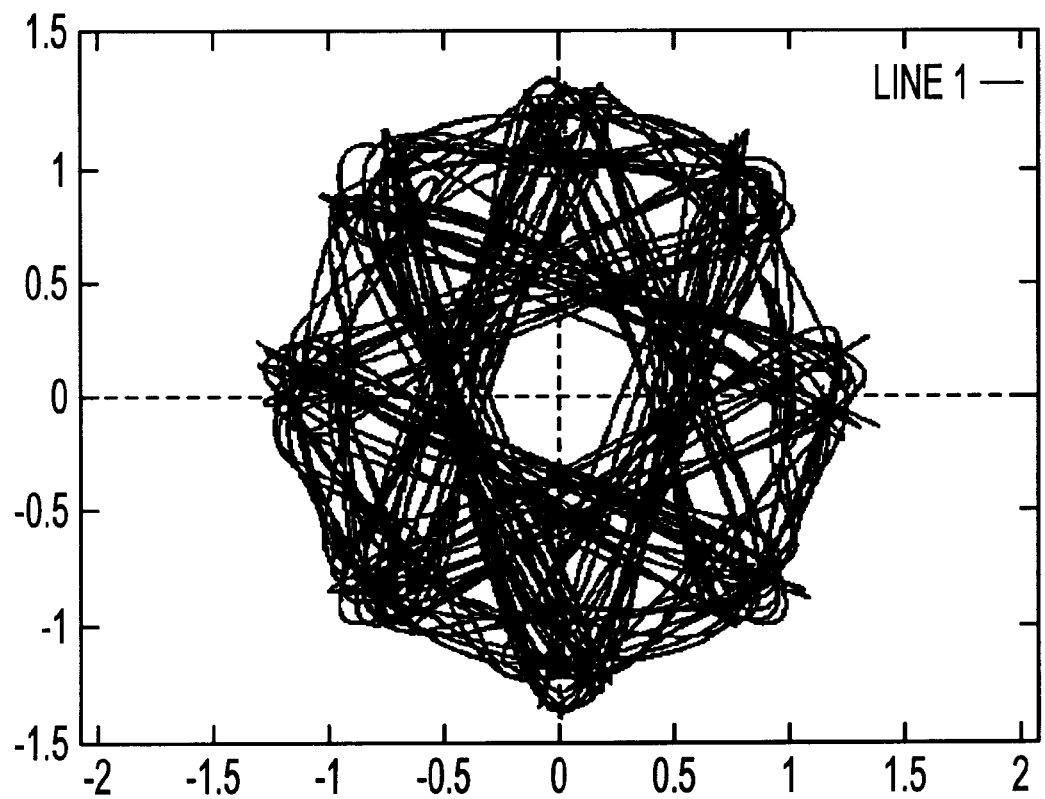
FIG. 6 shows the locus of the orthogonal modulation signal after it is passed through the low-pass filters 24, 26.
Figure 7:
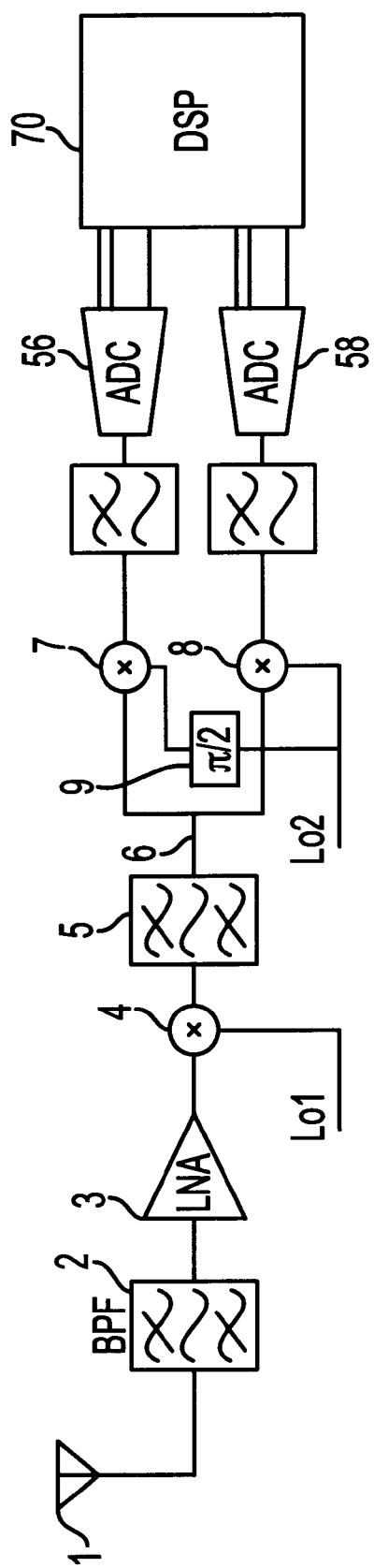
FIG. 7 is a diagram exemplifying a conventional receiving apparatus of a code spread communication type.

The locus of the orthogonal modulation signal shown in FIG. 5 shows the movement among eight symbol points at acute angles. This signal therefore undesirably includes a high-frequency component. This high-frequency component can however be removed by passing the signal through the low-pass filters 24 and 26 of RRCOS, RCOS or the like as mentioned earlier. FIG. 6 shows the locus of the orthogonal modulation signal after it is passed through the low-pass filters 24, 26. As illustrated, with the high-frequency component removed, the locus becomes a gentle curve. It is thus possible to narrow the frequency band of a demodulated wave.

According to this invention, as specifically described above, a code-spread reception signal can be converted to a signal of the base band by multiplying the reception signal by a demodulation signal whose carrier frequency is the reciprocal or non-reciprocal of the signal acquired by orthogonal modulation of a spreading code. That is, spread demodulation and orthogonal detection can simultaneously be carried out at the preceding stage of the high-frequency circuit. This allows only limited analog circuits in the receiving circuit to handle a reception signal of a wide frequency band and with a high SN ratio, so that the receiving circuit can be constituted of analog circuits having a narrower dynamic range than the conventional ones. Further, the digital signal processor need not perform a spread demodulation process.

Figure 8:
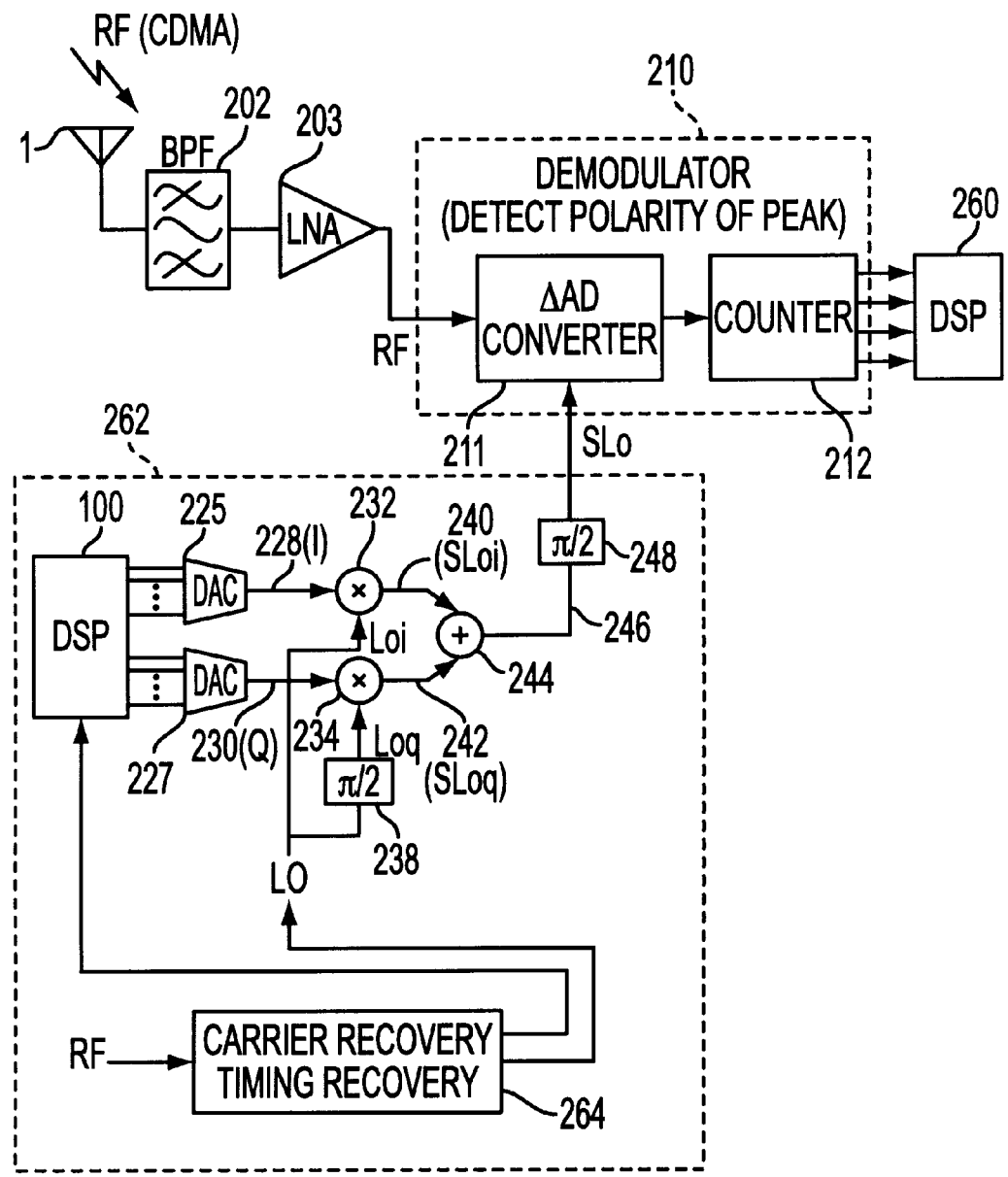
FIG. 8 is a diagram exemplifying the structure of a receiving apparatus of a code spread communication type according to this embodiment.

FIG. 8 is a diagram exemplifying the structure of a receiving apparatus of a code spread communication type according to the second embodiment. An antenna 1 of the receiving apparatus receives a high-frequency signal RF, which is acquired by performing code spreading, orthogonal modulation and frequency modulation on a transmission data signal in the transmitting apparatus shown in FIG. 3. The reception signal has its component of frequency bands other than the frequency band in use removed by a bandpass filter 202, and the resultant signal is then amplified by a low-noise amplifier 203. This high-frequency reception signal RF is supplied to a demodulator 210. The demodulator 210 detects the polarity of a peak value of the reception signal in response to the phase timing of a demodulation signal SLo.

A demodulation signal generator 262 has a digital signal processor (DSP) 100 which performs orthogonal modulation on a spreading code to generate a complex number signal, and digital-to-analog converters 225 and 227 which convert an I signal and Q signal, the outputs of the DSP 100, to analog signals. Multipliers 232 and 234 respectively multiply the converted analog I signal 228 and Q signal 230 by a local frequency signal Lo and a signal whose phase is shifted by $\pi/2$ from that of the signal Lo. That is, frequency modulation is carried out with the local frequency signal Lo as done in the transmission end. A high-frequency modulated I signal 240 and Q signal 242 are added by an adder 244. The phase of the resultant signal, 246, is shifted by $\pi/2$ by a $\pi/2$ shifter 248, yielding a demodulation signal SLo.

A carrier recovery/timing recovery circuit 264 executes detection of the carrier frequency of the reception signal RF and detection of the timing of a spreading code. The local frequency signal Lo is generated in accordance with the carrier frequency detected there. The DSP 100 generates a spreading code phase-synchronous with that on the transmission end, in accordance with the detected timing. Therefore, the demodulation signal SLo is synchronous in phase with the spreading code of the reception signal RF and has the same high frequency as that of the reception signal or a high frequency having a predetermined relation with the frequency of the reception signal RF.

The demodulator 210 has a delta analog-to-digital (AD) converter 211 and an integration counter 212. The delta AD converter 211 detects the polarity of the peak value of the reception signal RF in response to the phase timing of the demodulation signal SLo. For example, the delta AD converter 211 outputs the positive or negative polarity of the peak value of the reception signal RF as a detection signal of 1 or 0. The detection signal is counted by the counter 212 which has an integrating function. The counter 212 counts the detection signal from the delta AD converter 211, which lies in the period of a spreading code, and sends the count value to another digital signal processor (DSP) 260 as will be discussed later. A reception data signal of the base band is generated inside this DSP 260.

Figure 9:
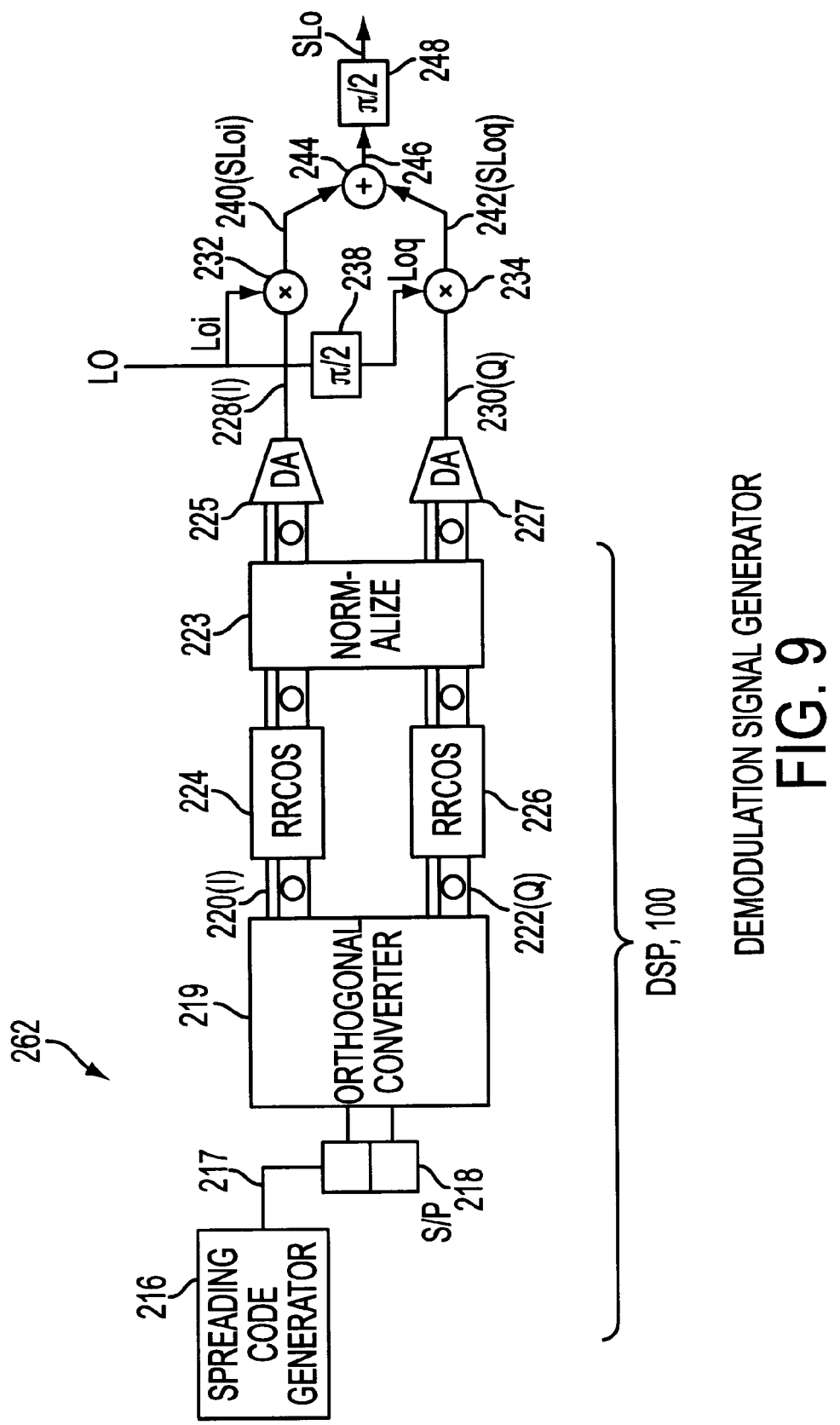
FIG. 9 is a diagram exemplifying the structure of a demodulation signal generator.

FIG. 9 is a diagram exemplifying the structure of a demodulation signal generator. FIG. 9 partially overlaps FIG. 8, so that reference numerals as shown in FIG. 8 are given to the corresponding portions in FIG. 9. In the demodulation signal generator 262 shown in FIG. 9, a spreading code generator 216 generates a spreading code signal 217, which is a spreading code assigned between the transmission and reception stations and is in phase with the spreading code signal on the transmission end. The aforementioned carrier recovery/timing recovery circuit 264 detects the timing using the normal system such as one that detects the phase of the spreading code signal at the time when the reception signal becomes strongest while the phase of the spreading code signal is being changed. This spreading code generator 216 generates the spreading code signal 217 in phase with the one on the transmission end in accordance with the detected timing.

Further, a serial-parallel converter 218 in the demodulation signal generator 262 performs, for example, serial-parallel conversion on a sequence of two bits in the spreading code 217 and sends the resultant signal to an orthogonal converter 219. This process is the same as the process of orthogonal modulation.

Then, the orthogonal converter 219 converts the signal of a sequence of two bits to four symbol points and produces I component signals 220 and Q component signals 222 at the coordinates of those symbol points. Those signals 220 and 222 pass through respective low-pass filters 224 and 226. The low-pass filters 224 and 226 are each comprised of a half Nyquist filter or the like of, for example, RRCOS (Root Raised Cosine), and removes the high-frequency component from the signal which moves among four symbols that have been produced as a result of the serial-parallel conversion. In other words, signal noise of the frequency, that is the frequency of the signal in the periods other than the period in which the signal moves among the symbol points, is removed. The low-pass filters 224 and 226 may be provided on the input side of the orthogonal converter 219.

The signals that have passed the low-pass filters 224 and 226 have their amplitudes made constant by a normalizer 223, and are then converted to analog signals 228 and 230 by DA converters 225 and 227 respectively. The analog I component signal 228 and Q component signal 230 are multiplied in multipliers 232 and 234 by a local frequency signal Lo, which has been produced by a local oscillator as has been discussed with reference to FIG. 8. As the I component signal 228 and Q component signal 230 are multiplied by the local oscillation frequency signal Lo whose phase has been shifted by $\pi/2$ by a $\pi/2$ shifter 238, an I signal 240 and a Q signal 242 are produced. The frequency of this local oscillation frequency signal Lo is the same as, or has a predetermined relationship with, the carrier frequency signal of the received signal 243. Multiplying the I component signal 228 and Q component signal 230 by the local oscillation frequency signal Lo therefore yields the I signal 240 and the Q signal 242 both of the same frequency band as that of the carrier frequency signal or of a band having a predetermined relationship with that of the carrier frequency signal.

Those circuits at the preceding stages of the DA converters 225 and 227 in FIG. 9 are implemented by the DSP 100.

Figure 10:
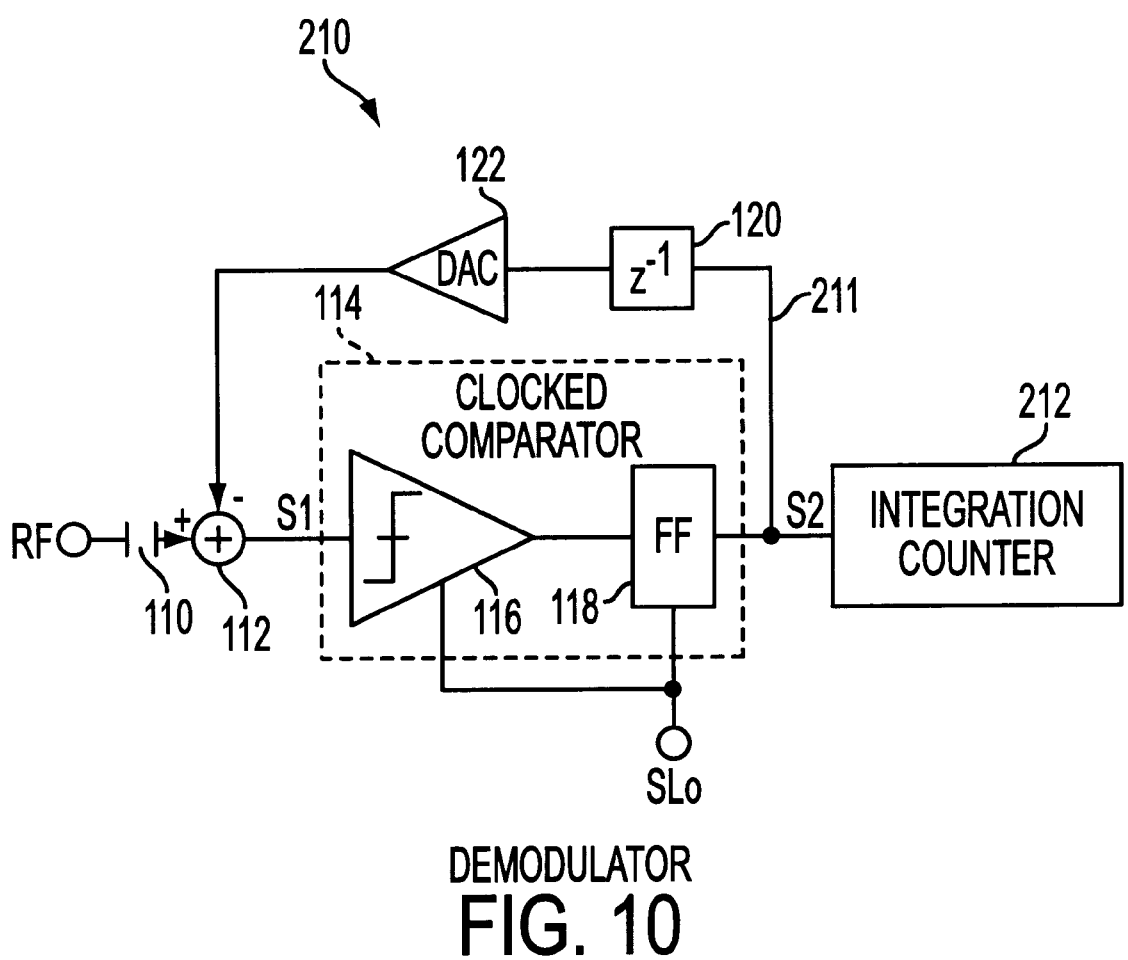
FIG. 10 is a diagram showing a specific structure of a demodulator 210.

FIG. 10 is a diagram exemplifying the specific structure of the demodulator 210. The demodulator 210, as shown in FIG. 8, has the delta AD converter 211 and the counter 212 which integrates the output of the delta AD converter 211. The delta AD converter 211 includes an input capacitor 110 to which the reception signal RF is supplied, a comparator 114 connected to the input capacitor 110, a delay circuit 120, a digital-to-analog (DA) converter 122 and an adder 112. The comparator 114 compares an input signal S1 with a predetermined threshold voltage in response to the phase timing of the demodulation signal SLo used as a sampling signal, and outputs the comparison result in the form of a digital signal. The output, S2, of the comparator 114 is fed back in a loop of the delay circuit 120, the DA converter 122 and the adder 112, and its analog voltage is accumulated in the input capacitor 110.

The delta AD converter 211 therefore compares the input signal Si with the predetermined threshold value and negatively feeds back the comparison result or a difference between them to the input side. The difference is stored in the input capacitor 110. As the number of H levels in the output S2 of the comparator 114 increases, an analog value corresponding to the H level is fed back to and stored in the input capacitor 110 accordingly. The sum of the high-frequency component of the high-frequency reception signal RF and the level of the charges stored in the input capacitor 110 is input as the input signal Si to the comparator 114. The increased number of H levels in the output S2 therefore pulls down the entire level of the input signal S1. As the number of L levels in the output S2 increases, the entire level of the input signal S1 is pulled up. This can allow the to-be-detected signal level of the input signal SI to be always kept at the middle of the dynamic range of the comparator 114, thus ensuring high-precision comparison. The comparator 114 functionally has a comparison circuit 116 for comparing the input signal S1 with a predetermined, unillustrated threshold value and a latch circuit 118 which latches the comparison result in response to the phase timing of the demodulation signal SLo. If the latch circuit 118 implements a function of a delay of one period, the delay circuit 120 is unnecessary.

The counter 212 increments the integral value when the digital output S2 of the comparator 114 has an H level and decrements the integral value when the digital output S2 has an L level. The counter 212 outputs the integral value, incremented or decremented during one period of the spreading code.

Figure 11:
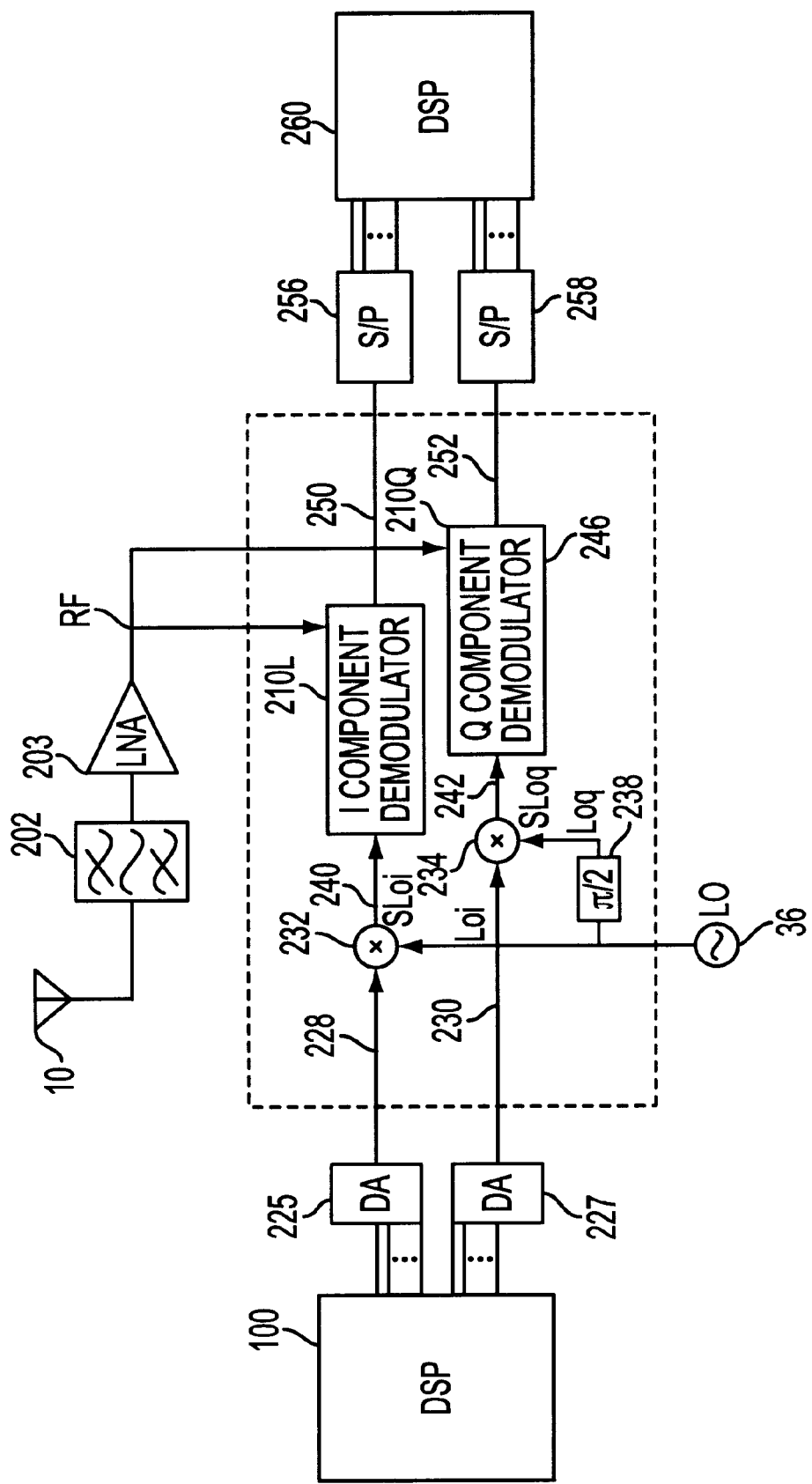
FIG. 11 is a diagram depicting the structure of a receiving apparatus according to another embodiment.

FIG. 11 is a diagram depicting the structure of a receiving apparatus according to another second embodiment. The DSP 100, which generates the spreading code that has been used in transmission between stations and performs orthogonal modulation on the spreading code to produce the I component signal 228 and Q component signal 230, and the DA converters 225 and 227 at the output stage of the DSP 100 are the same as those shown in FIG. 8. The produced I component signal 228 is multiplied by a signal Loi or a local frequency signal Lo, and the Q component signal 230 is multiplied by a local frequency signal Loq whose phase is shifted by $\pi/2$ from that of the local frequency signal Lo, yielding frequency-modulated, demodulation signals SLoi and SLoq. This process is also the same as that performed in the example of FIG. 8.

In the example of FIG. 11, the I component demodulation signal SLoi is supplied to an I component demodulator 210I and the Q component demodulation signal SLoq is supplied to a Q component demodulator 210Q. The two demodulators 210I and 210Q, which are supplied with the high-frequency reception signal RF, detect the polarity of the reception signal RF using the demodulation signals SLoi and SLoq as sampling signals. An I component 250 and Q component 252 of a transmission data signal of the base band, detected by the respective demodulators, are converted to parallel signals by serial-parallel converters 256 and 258, respectively. The parallel-converted signals are supplied to the DSP 260. Those I component 250 and Q component 252 are combined inside the DSP 260, yielding a transmission data signal.

The principle of directly demodulating the reception signal RF using the receiving apparatus with the structure illustrated in FIGS. 8 through 11 will now be explained with reference to FIGS. 12 through 15.

Figure 12:
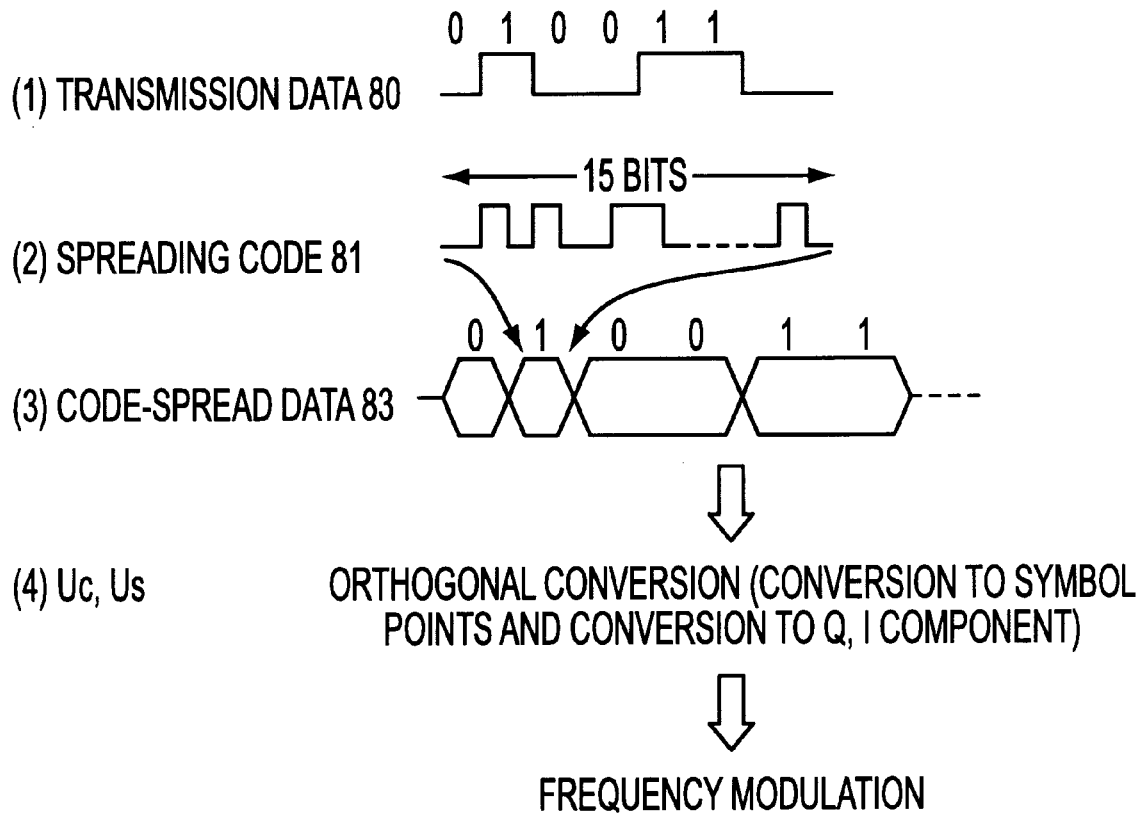
FIG. 12 is a diagram for explaining modulation on the transmission end.

FIG. 12 is a diagram for explaining modulation on the transmission end. The reference numerals given to the transmitting apparatus in FIG. 3 are also used in FIG. 12. The following description will be given of a case where transmission data 80 is "010011" and a spreading code 81 has a sequence of arbitrary fifteen bits. The transmission data 80 and the spreading code 81 are combined by an EOR gate 82, which outputs a code-spread data sequence 83. Specifically, when the transmission data 80 is "1," it is converted to a 15-bit spreading code 81, and when the transmission data 80 is "0," it is converted to a 15-bit spreading code 81 with the polarity inverted. Every time the polarity of the transmission data 80 is changed, therefore, the polarity of the code-spread data sequence 83 output from the EOR gate 82 is inverted.

Figure 13:
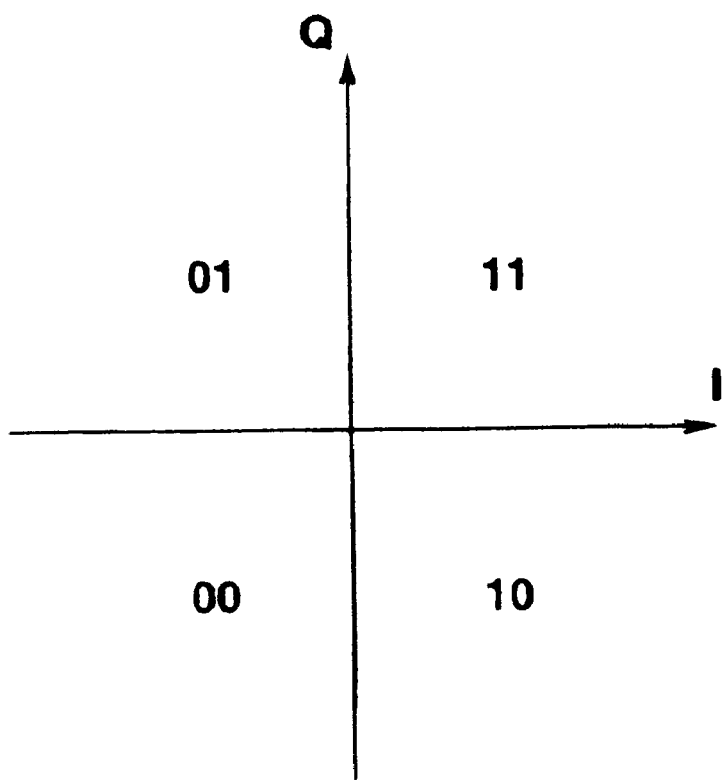
FIG. 13 is a diagram for explaining modulation on the transmission end.

The data sequence 83 is converted by the serial-parallel converter 84 shown in FIG. 3 to a sequence of two bits which are converted to four symbol points shown in FIG. 12 by the orthogonal converter 90a in FIG. 3. FIG. 13 is a diagram showing an example of converting a sequence of two bits to four symbol points. The code-spread data sequence 83 is separated to 2-bit sequences which are in turn converted to corresponding symbol points. The I component signal and Q component signal at each symbol point become signals uc and us in FIG. 3. Frequency modulation is carried out by respectively multiplying the orthogonal-modulated signals uc and us by a local frequency signal Lo3 and a signal whose phase is shifted by $\pi/2$ from that of the signal Lo3. Those frequency-modulated signals are combined and the resultant signal is transmitted from an antenna 89.

Figure 14:
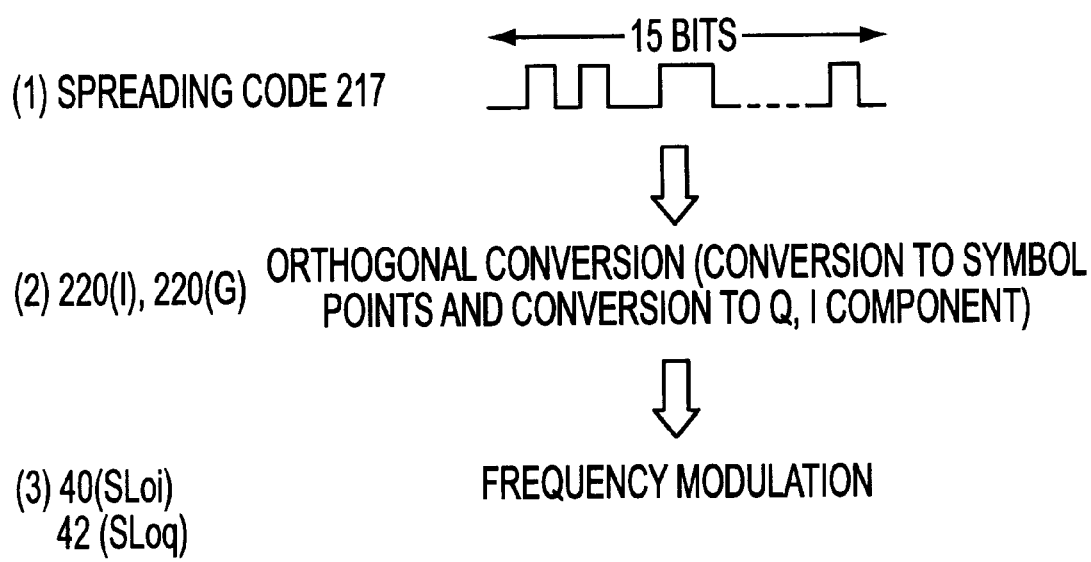
FIG. 14 is a diagram for explaining a demodulation signal SLo.

FIG. 14 is a diagram for explaining the demodulation signal SLo. Reference numerals in the diagram are the same as those shown in FIG. 9. Generation of the demodulation signal SLo is performed in the same way as done for a signal obtained by code-spreading transmission data. The spreading code 217 is also a sequence of fifteen bits in this example. The receiving apparatus can detect the used spreading code from the reception signal. Then, the serial-parallel converter 218 and the orthogonal converter 219 likewise convert a sequence of two bits to four symbol points and the I component signal 220 and Q component signal 222 are produced. The I component signal 220 and Q component signal 222 are then frequency-modulated as they are multiplied by the local frequency signals Loi and Loq, which have the same frequency as, or frequencies having a predetermined relation with, the frequency of the transmission carrier signal, yielding the demodulation signals SLoi and SLoq.

Figure 15:
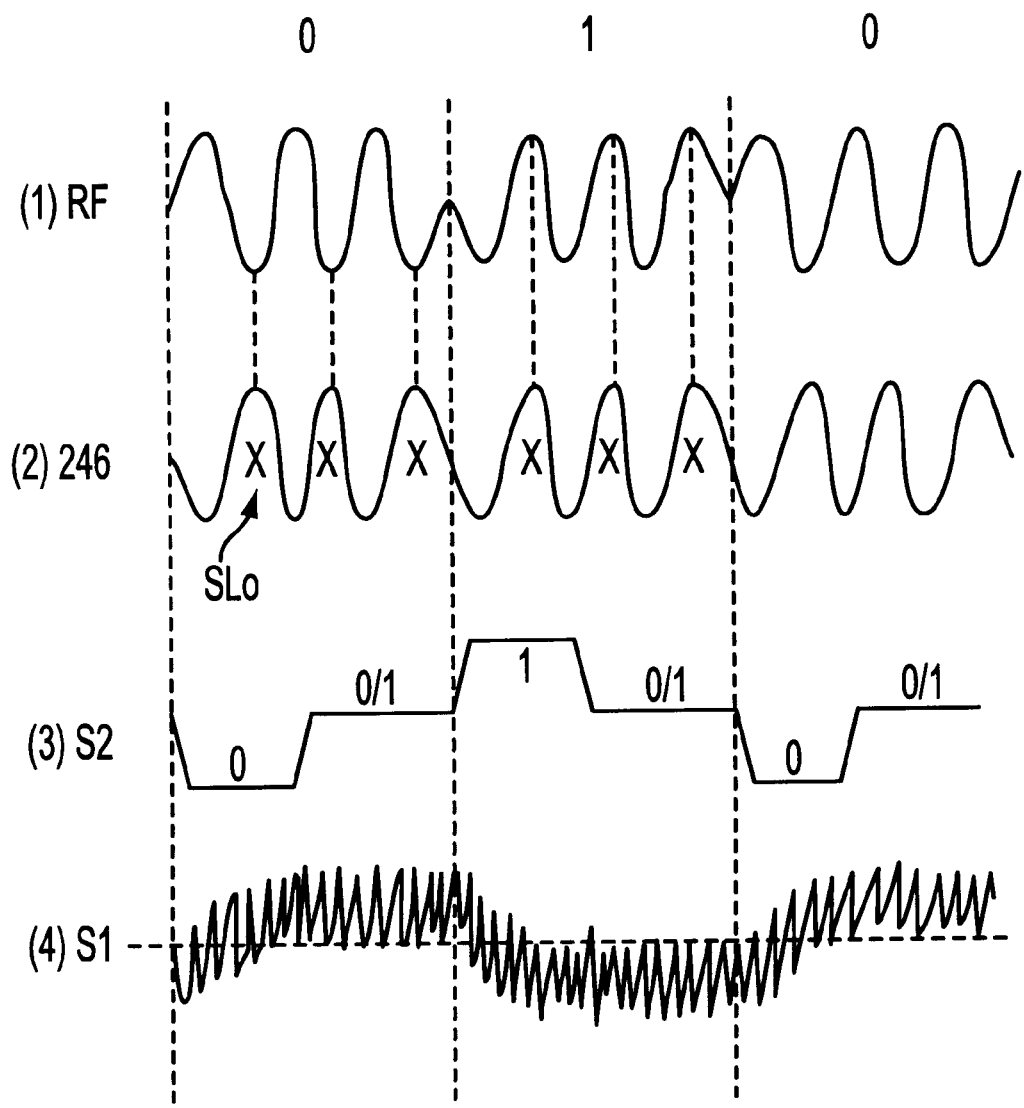
FIG. 15 is a diagram for explaining the internal operation of a delta AD converter shown in FIG. 10.
Figure 16:
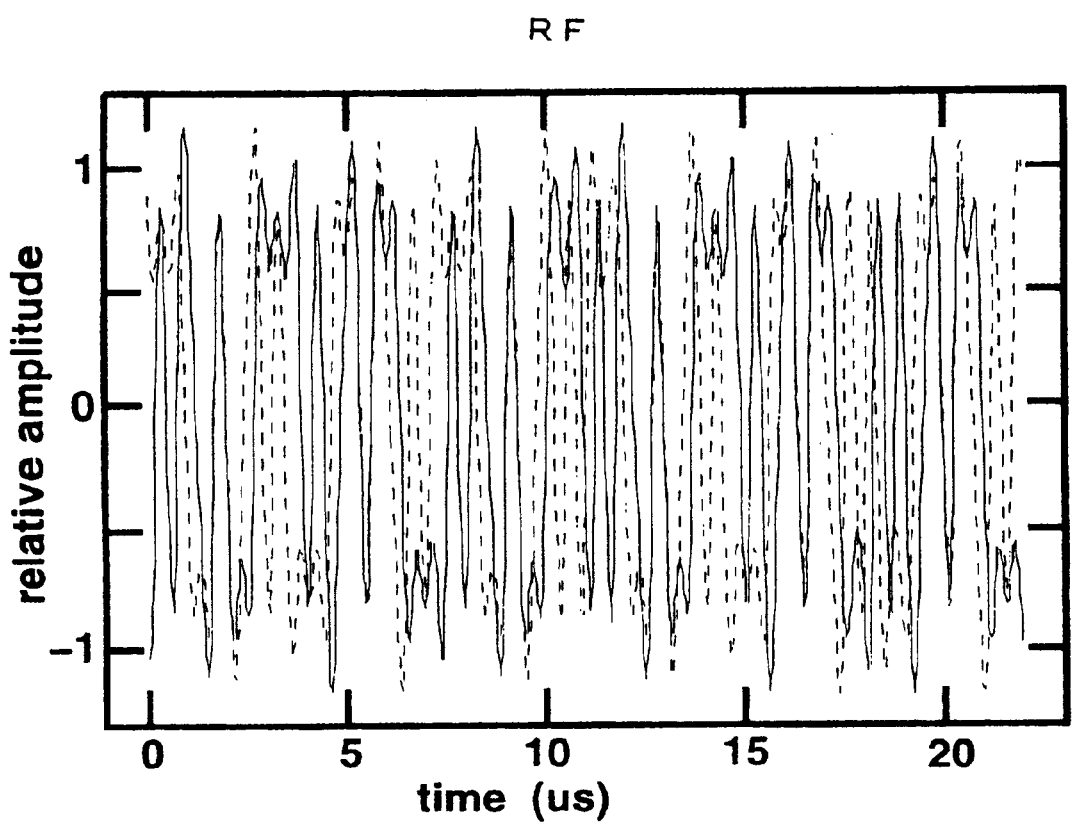
FIG. 16 shows a reception signal RF in simulation.
Figure 17:
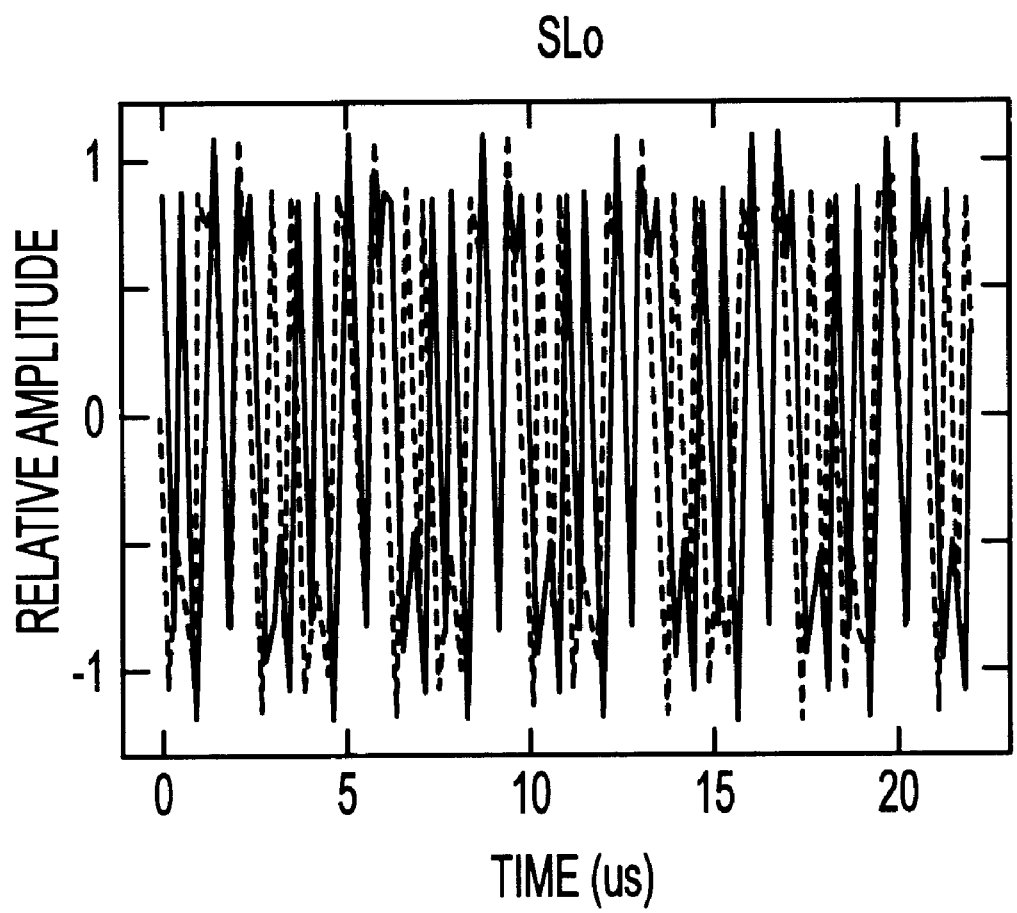
FIG. 17 illustrates a demodulation signal SLo in simulation.
Figure 18:
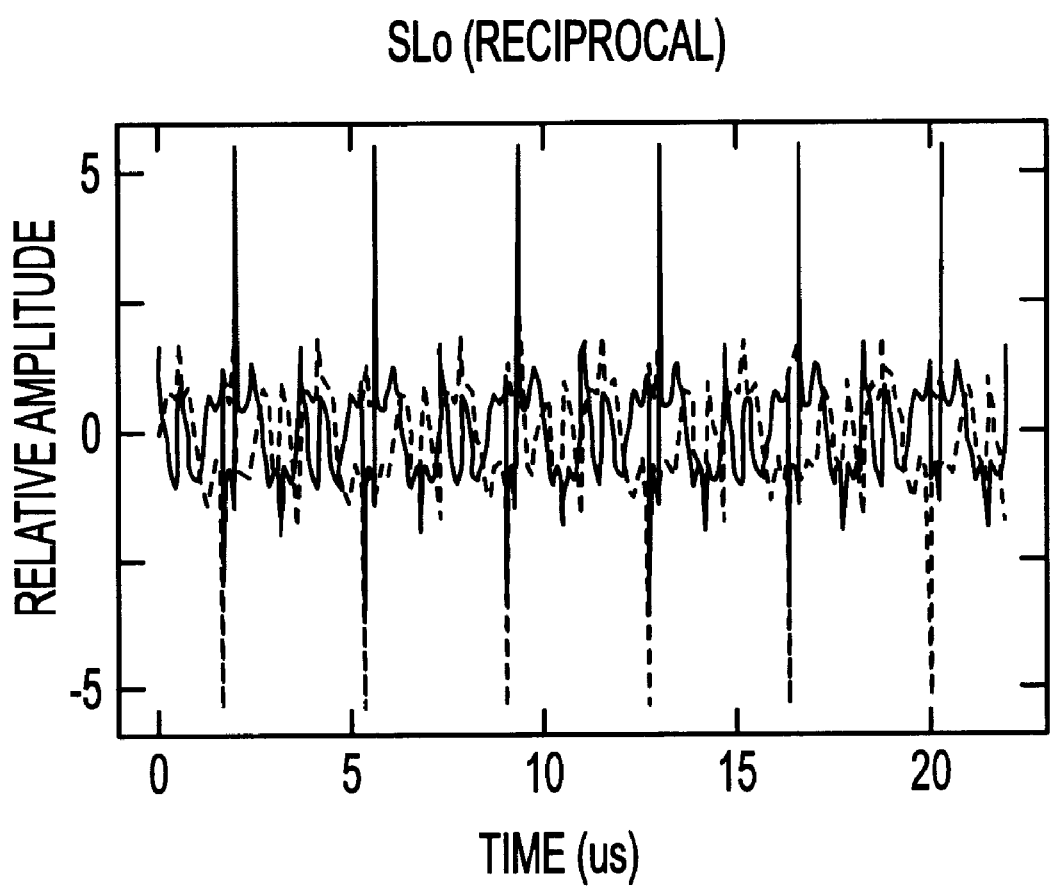
FIG. 18 depicts a demodulation signal SLo of the reciprocal of a complex number in simulation.
Figure 19:
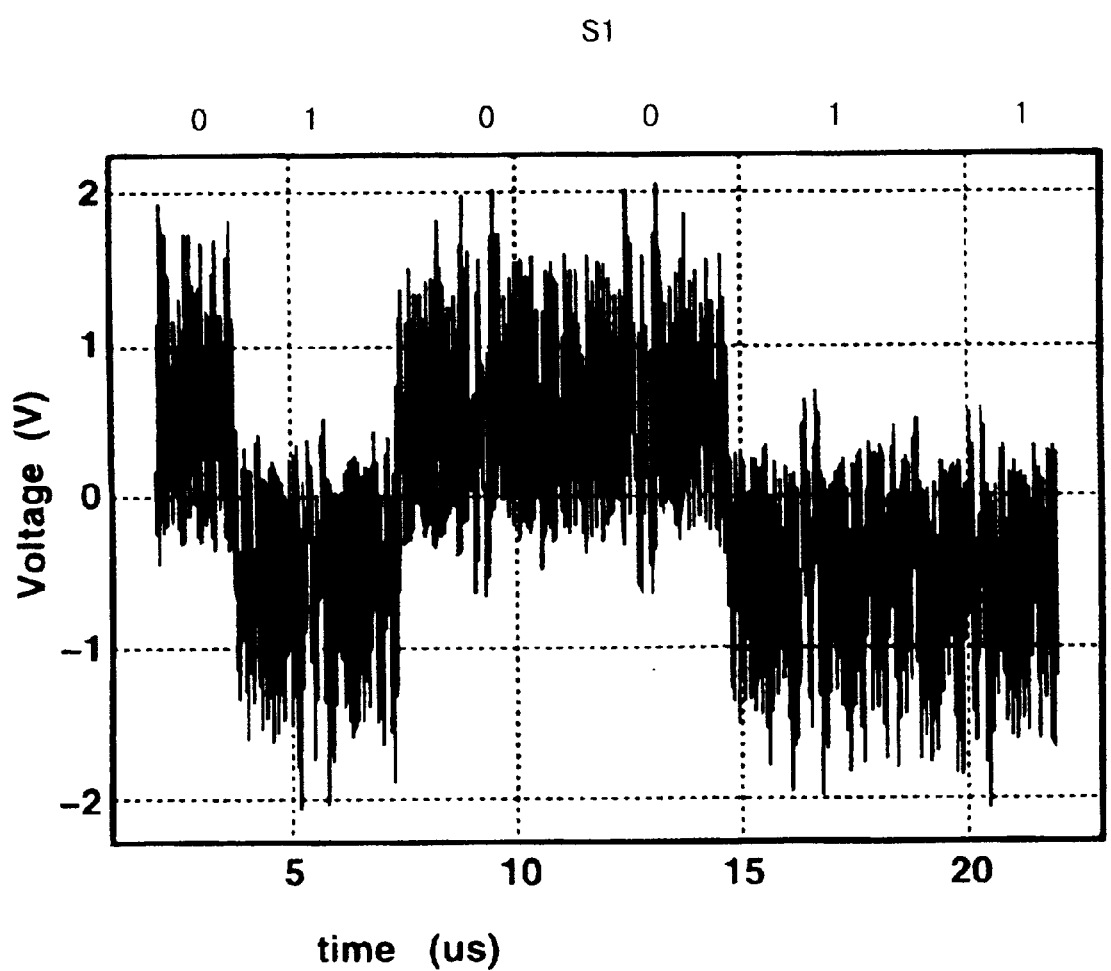
FIG. 19 shows an input signal S1 of a comparator 114 in simulation.

FIG. 15 is a diagram for explaining the internal operation of the delta AD converter 211 shown in FIG. 10. Reference numerals in the figure are the same as those shown in FIG. 10. FIG. 15 shows the reception signal RF in a pseudo form. As the reception signal RF is produced by converting transmission data "010" to a spreading code, its polarity inverts between "1" and "0" of the transmission data. The signal 246, acquired by combining the demodulation signals SLoi and SLoq as shown in FIG. 8 has the same phase relationship with the reception signal RF for the spreading code which corresponds to the transmission data of "1." In FIG. 8, the demodulation signal SLo is generated by shifting the phase of the signal 246 by $\pi/2$. The phase timing of the demodulation signal SLo becomes the sampling timing of the delta AD converter 211. In this example, the comparison timing of the delta AD converter 211 is the zero-crossing point (phase angle of 0 degree) of the demodulation signal SLo. That is, the comparator 114 performs comparison at the timing shifted by 90 degrees from the signal 246 (sampling point indicated by SLo in FIG. 15). In other words, the comparator 114 carries out comparison for checking if the peak value of the reception signal RF is positive or negative.

FIG. 15 shows the relationship between the output S2 and the input S1 of the comparator 114 in that case. When data is "0," the polarity of the demodulation signal 246 is opposite to the polarity of the reception signal RF. Therefore, the peak value of the reception signal RF at the sampling point of the demodulation signal SLo is negative, so that as the output S2 of the comparator 114, "0" (L level) is output more at first. This output is fed back to the input capacitor 110 to be stored there. Accordingly, the level of the input S1 of the comparator 114 increases gradually so that the lower peak comes near zero. Thereafter, the numbers of "0" and "1" to be output as the output S2 of the comparator 114 therefore become substantially equal to each other. In accordance with the output of the comparator 114, the count value of the integration counter 212 is incremented or decremented. When reception data is "0," the count value of the counter 212 is frequently decremented in the example of FIG. 15. It is therefore possible to detect if reception data is "0" by checking the output of the counter 212 one period later.

When reception data changes to "1" from "0," the reception signal RF has the same phase as that of the demodulation signal 246. Thus, the zero-crossing point of the sampling demodulation signal SLO which is the demodulation signal 246 shifted by $\pi/2$ is synchronous with the high peak value of the reception signal RF. When data changes to "1" from "0," an output of "1" (H level) is produced more in the comparator 114. This output is fed back to the input side to be stored in the input capacitor 110, so that the level of the input S1 decreases gradually. The peak value of the input signal S1 becomes substantially zero. In accordance with the output of the comparator 114, the count value of the counter 212 is incremented or decremented. It is therefore possible to detect if reception data is "1" by checking the output of the counter 212 at the end of that period.

Figure 20:
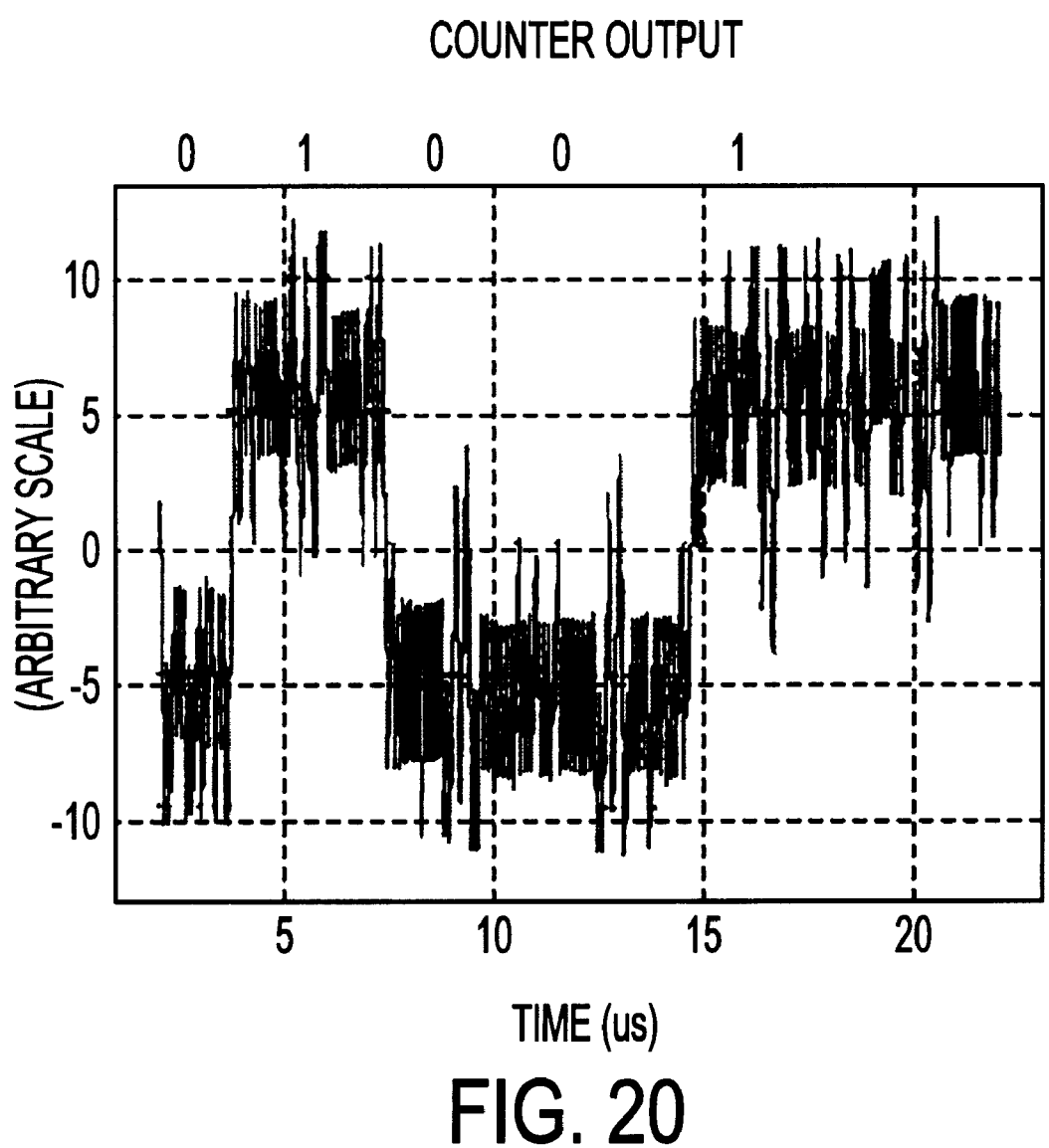
FIG. 20 depicts the output of a counter 215 in simulation.

FIGS. 16 through 20 show the results of simulation conducted by the present inventor. In the simulation, a spreading code of predetermined fifteen bits was used for transmission data of "010011" as in the above-described case. FIGS. 16–20 respectively show the reception signal RF (FIG. 16), the demodulation signal SLo (FIG. 17), the demodulation signal SLo of the reciprocal of a complex number (FIG. 18), the input signal S1 of the comparator 114 (FIG. 19) and the output of a counter 215 (FIG. 20). As has already discussed with reference to FIG. 15, the input signal S1 shown in FIG. 19 becomes positive, negative, positive, negative and negative with respect to the transmission data "010011." It is apparent from FIG. 20 that the output of the counter 215 which has been incremented or decremented in accordance with the output S2 of the comparator 114 is negative for data "0" and positive for data "1."

In FIG. 8, the phase of the demodulation signal SLo is shifted by $\pi/2$ by the $\pi/2$ shifter 248. This $\pi/2$ shifter 248 however becomes unnecessary by properly setting the phase relationship between the local frequency signals Loi and Loq in accordance with the phases of the I component signal Ci and Q component signal Cq of the carrier signal of the reception signal.

Figure 21:
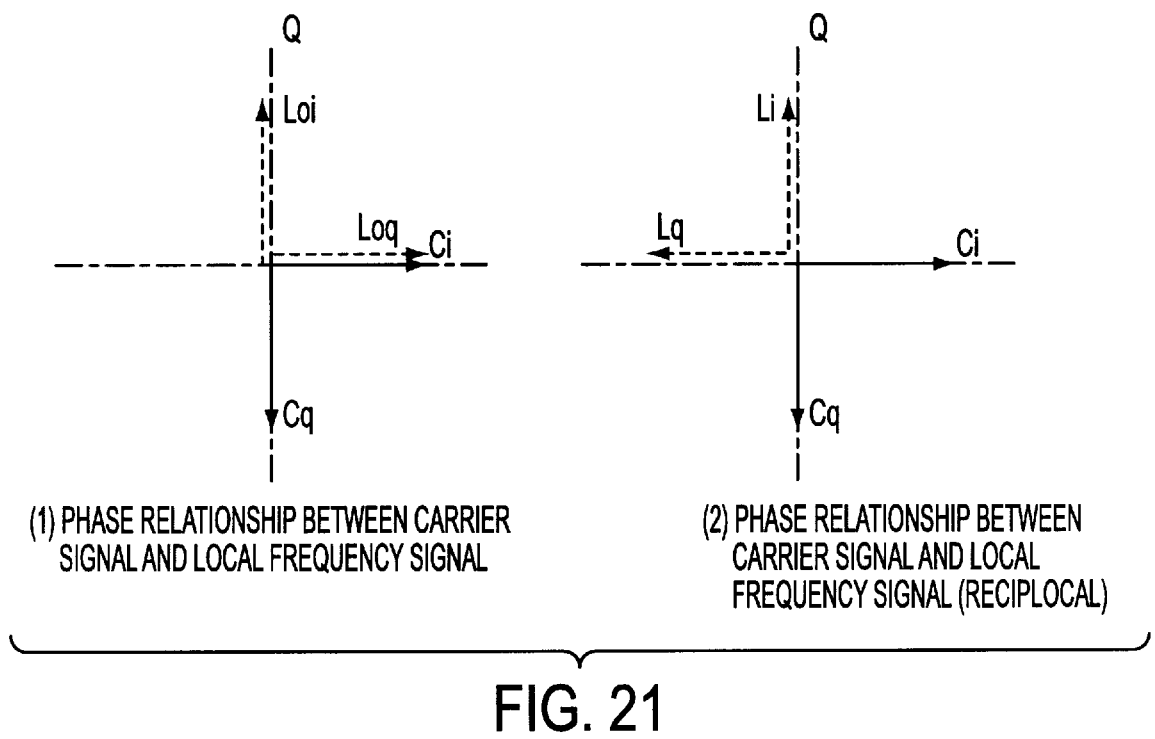
FIG. 21 is a diagram showing the phase relationship between a carrier signal and a demodulation signal.

FIG. 21 is a diagram showing the phase relationship between the carrier signal and the local frequency signal of the demodulation signal generator. The left-hand side (1) in FIG. 21 shows the phase relationship among the carrier signals Ci and Cq and the local frequency signals Loi and Loq, which can eliminate the need for the $\pi/2$ shifter 248. In this example, the phase of the I component signal Ci of the carrier signal of the transmission signal is leading by 90 degrees from the phase of the Q component signal Cq. By contrast, the phases of the local frequency signals Loi and Loq shown in FIG. 8 or FIG. 9 are leading by 180 degrees from those of the carrier signals Cq and Ci.

In the demodulation signal generator shown in FIG. 9, a signal obtained by subjecting the spreading code 217 to orthogonal modulation was directly used as demodulation signals SLoi and SLoq. Alternatively, the demodulation signals may be acquired from the reciprocal of the complex number of the spreading code 217 which may be obtained by the orthogonal converter 219 or the normalizer 223.

The right-hand side (2) in FIG. 21 shows the phase relationship among the carrier signals Ci and Cq and the local frequency signals Loi and Loq, in the case where the reciprocal of the complex number of the spreading code which has undergone orthogonal modulation is used. As illustrated, the phase relationship between the local frequency signals Loi and Loq becomes inverted from that shown on the left-hand side (1) in FIG. 21, and the phases of those signals Loi and Loq are leading by 90 degrees and are lagging by 90 degrees from the phases of the respective components of the carrier signal. This relationship can allow the demodulation signal SLo having the proper phase timing to be generated as a sample signal even when the reciprocal of the spreading code that has undergone orthogonal modulation is used.

The phase relationship in FIG. 21 is just one example, and it should be apparent to those skilled in the art that to generate the desired demodulation signal, the phase relationship between the local frequency signals Loi and Loq can be modified in many various other forms in accordance with the phase relationship between the carrier signals Ci and Cq.

Figure 22:
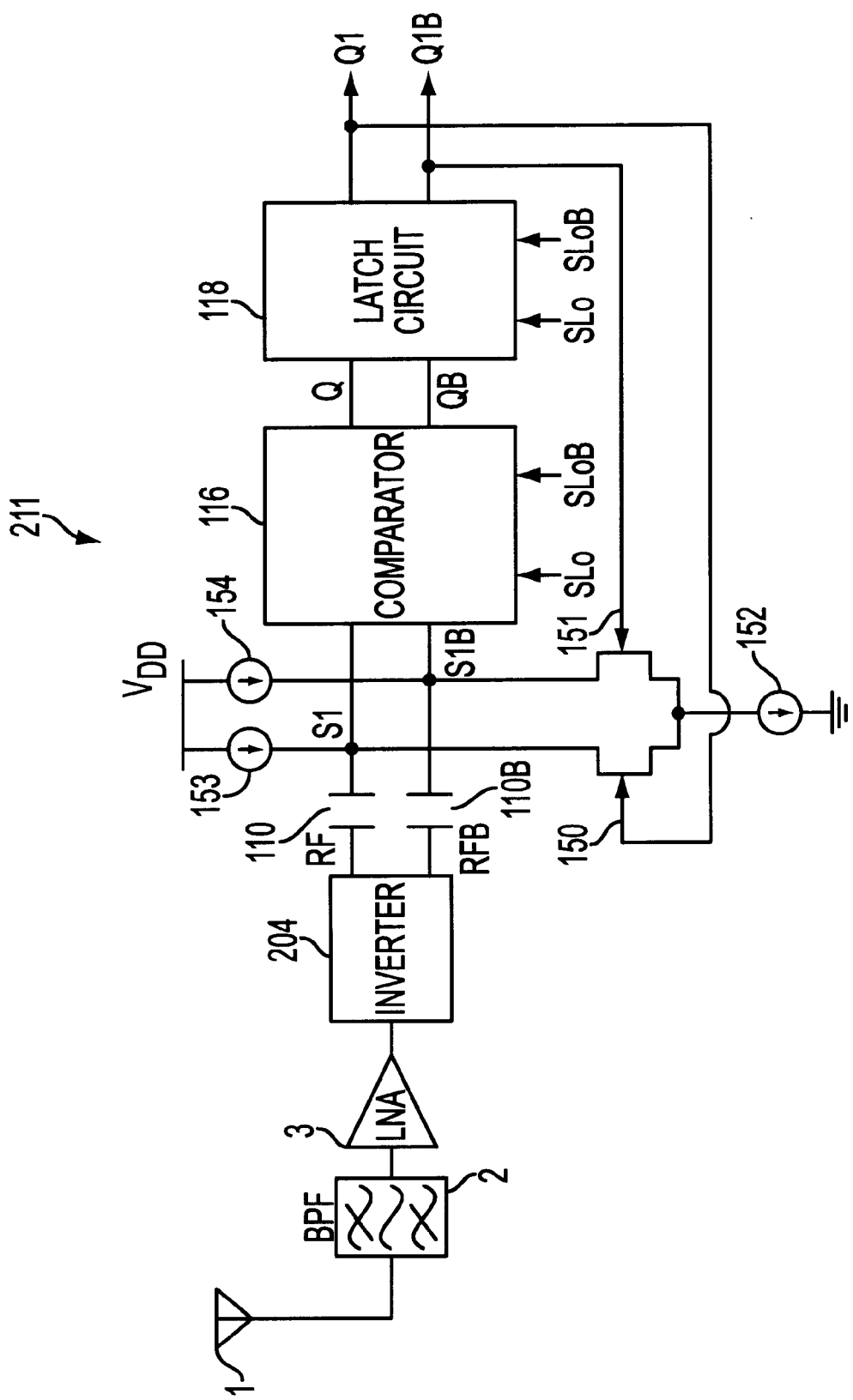
FIG. 22 is a detailed circuit diagram of a delta AD converter 211.

FIG. 22 presents a detailed circuit diagram of the delta AD converter 211. In this example, the delta AD converter 211 comprises an inverter 204 for generating the reception signal RF and its inverted signal RFB, input capacitors 110 and 110B to which the signals RF and RFB are respectively input, a comparator 116 which receives their inverted signals, and a latch circuit 118 which holds the output of the comparator 116. The comparator 116 itself has a latch function, so that the comparator 116 and the latch circuit 118 constitute master and slave latch circuits. The latch circuit 118, provided as the slave circuit, can provide a one-clock delay function. The operations of the comparator 116 and the latch circuit 118 are controlled by the demodulation signal SLo and its inverted signal SLoB, respectively. The outputs, Q1 and Q1B, of the latch circuit 118 are fed back to control transistors 150 and 151 which control current sources 152 to 154. When the output Q1 has an H level (output of "1"), for example, the transistor 150 is rendered conductive to cause the current source 152 to draw out charges from the input capacitor 110. As a result, the input level of the comparator 116 is pulled down. When the output Q1 has an L level (output of "0"), on the other hand, the transistor 151 conducts to cause the current source 153 to store charges in the input capacitor 110. As a result, the input level of the comparator 116 is pulled up.

Figure 23:
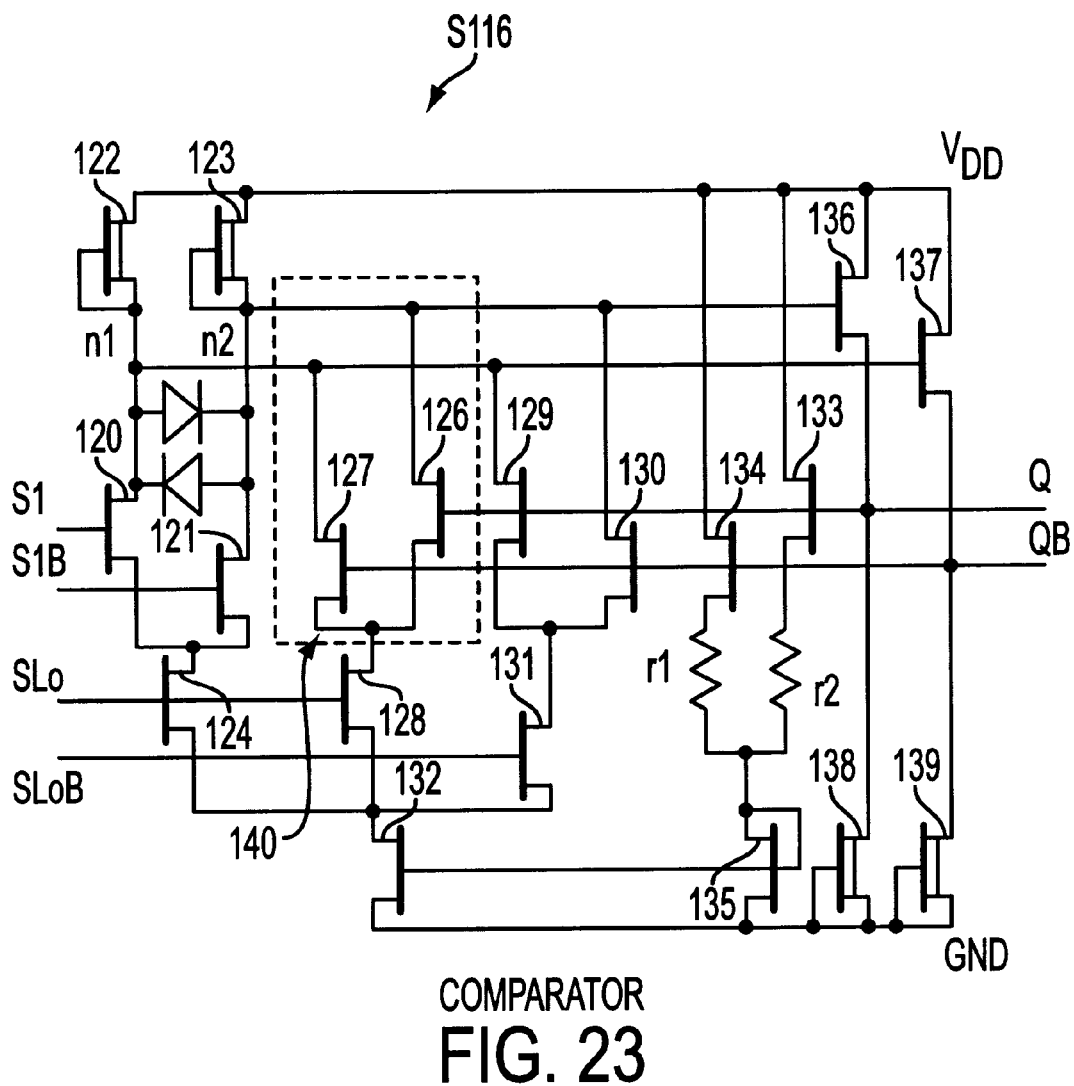
FIG. 23 is a specific circuit diagram of a comparator 116.

FIG. 23 presents a specific circuit diagram of the comparator 116. It is preferable that the comparator 116 be realized by a circuit of fast HEMT transistors as illustrated.

The comparator circuit shown in FIG. 23 has a D latch circuit function capable of ensuring fast comparison. The demodulation signal SLo and its inverted signal SLoB are used as sampling clock signals. Input signals S1 and S1B are respectively supplied to the gates of transistors 120 and 121 which constitute a differential circuit. Depletion type load transistors 122 and 123 are respectively connected to the transistors 120 and 121 on the power supply $V_{DD}$ side. The demodulation signal SLo is input to the gate of a current source transistor 124 connected to the common source of the transistors 120 and 121.

At the timing where the demodulation signal SLo passes a phase angle of 0 degree, the level of its inverted signal SLoB becomes lower than that of the demodulation signal SLo. Of transistors 124, 128 and 131 connected to a current source transistor 132, the transistors 124 and 128 conduct. As a result, one of the transistors 120 and 121 which constitutes a differential circuit conducts. When the level of the input signal S1 is higher than that of its inverted signal S1B, the transistor 120 conducts, pulling down the level at the node n1. The transistor 121 however becomes non-conductive, pulling up the level at the node n2. Because of source-follower transistors 136 and 137, the levels at the nodes n2 and n1 cause the outputs Q and QB to be set to H and L levels respectively.

When the polarities of the demodulation signal SLo and its inverted signal SLoB are inverted (phase angle of 180 degrees), the transistor 131 conducts. As a result, of transistors 129 and 130 constituting the latch circuit, the transistor 129 to which the H-level output Q is supplied is rendered conductive, allowing the status at the node n1 (L level) and the status at the node n2 (H level) to be latched.

Transistors 133 and 134, resistors r1 and r2, and transistors 126, 127 and 128, which form an additional differential circuit, constitute a common feedback circuit. This circuit can stabilize the levels of the outputs Q and QB in the following manner. When the output Q becomes an H level and the output QB becomes an L level, the signals are positively fed back to the transistors 126 and 127. Consequently, the transistor 126 conducts, preventing the H level of the output Q from becoming too high. Likewise, the transistor 127 becomes non-conductive, preventing the L level of the output QB from becoming too low.

Figure 24:
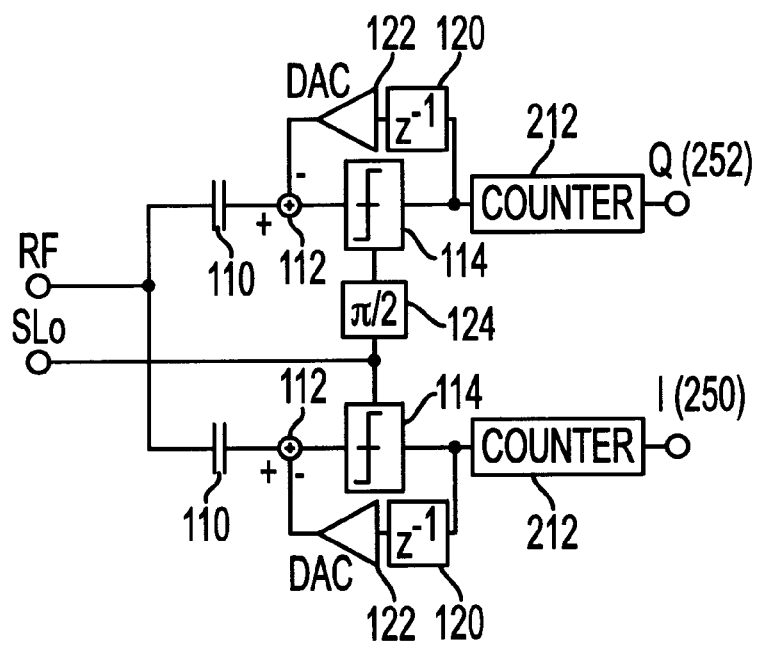
FIG. 24 is a diagram depicting demodulators 210I and 210Q of the embodiment illustrated in FIG. 11.

FIG. 24 is a diagram depicting demodulators 210I and 210Q of the embodiment illustrated in FIG. 11. FIG. 24 shows two demodulators which respectively generate the I component signal 250 and Q component signal 252 with respect to the high-frequency input signal RF. Those demodulators have the same structure as shown in FIG. FIG. 10, so that same reference numerals as used in the diagram are given to corresponding components in FIG. 24. The phases of the demodulation signals SLo which are supplied to the comparators 114 on the I component side and the Q component side are shifted from each other by π/2 by the π/2 shifter 124.

Figure 25:
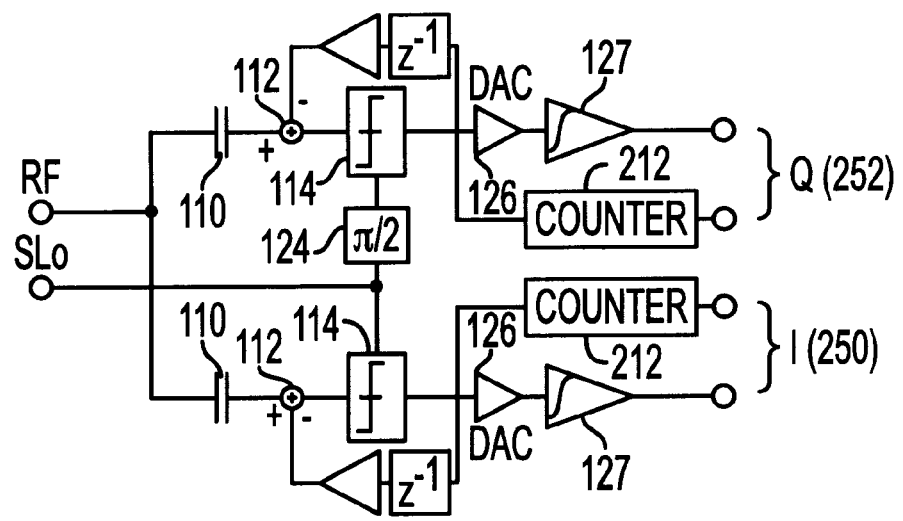
FIG. 25 shows a modification of the demodulators in FIG. 24.

FIG. 25 shows a modification of the demodulators in FIG. 24. In this example, the outputs of the comparators 114 are given to the respective counters 212, generating a digital I component signal 250 and Q component signal 252. The output of each comparator 114 is supplied to an analog counter which is constituted by a DA converter 126 and an integrator 127, thereby generating an analog I component signal or Q component signal.

Figure 26:
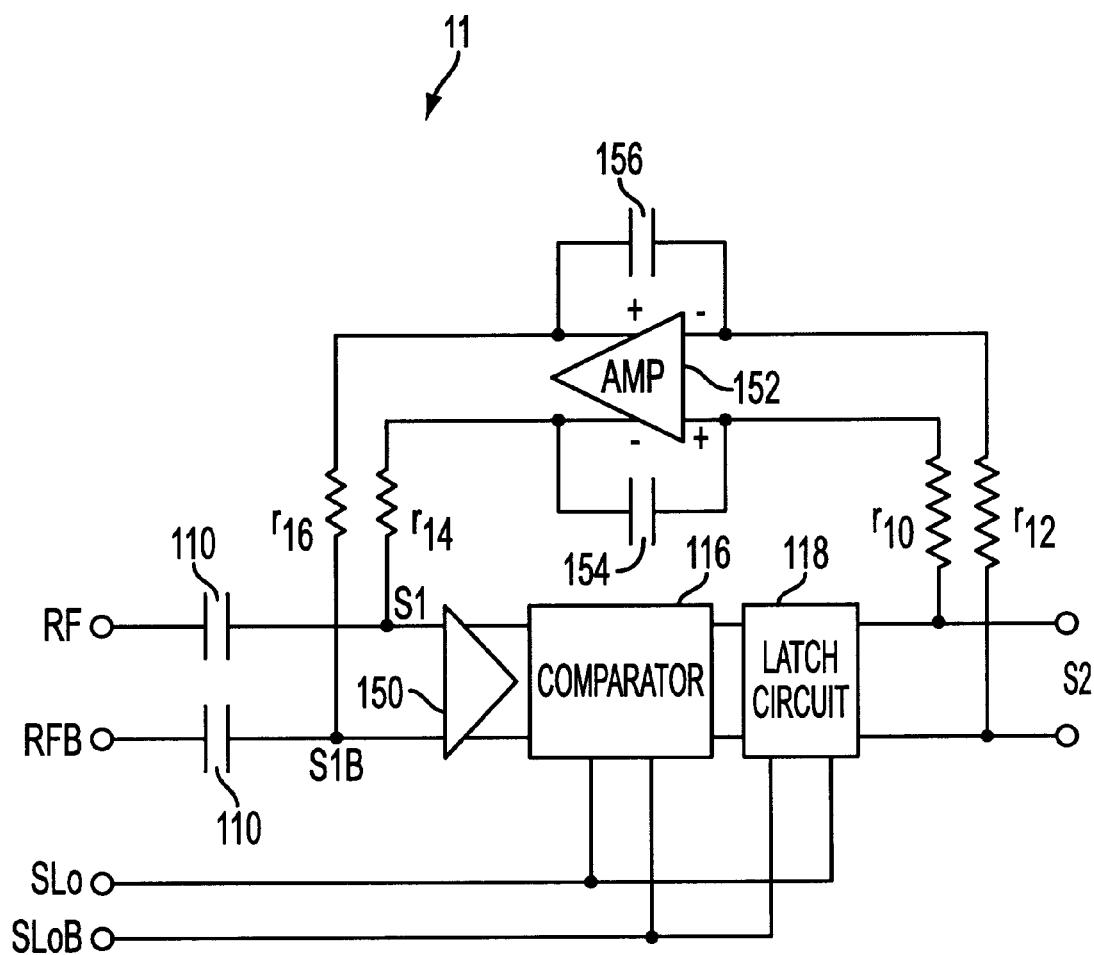
FIG. 26 is a diagram showing another structure of the delta AD converter.

FIG. 26 is a diagram showing another structure of the delta AD converter. In the structure shown in FIG. 26 as the one in FIG. 22, the reception signal RF and the signal RFB of the opposite phases are input and the demodulation signal SLo and the signal SLoB of the opposite phases are used as sampling signals. The comparator 116, the latch circuit 118 and the input capacitor 110 are the same as those in FIG. 22.

In the delta AD converter shown in FIG. 26, the input signal S1 is supplied via an input buffer 150 to the comparator 116. As shown in FIG. 23, the input signals S1 and S1B are supplied to the gates of the transistors 120 and 121, which constitute a differential circuit. As the output signal S2 is negatively fed back, the input signals S1 and S1B have relatively large amplitudes. When the input signals S1 and S1B are input directly to the gates of the transistors 120 and 121, the large amplitudes cause the gate current specific to an MESFET like HEMT to be generated. Leakage of charges from the input capacitor 110 due to the gate current should be avoided. The input buffer 150 is thus provided to prevent the charges from leaking from the input capacitor 110 even if the gate current is generated.

Figure 27:
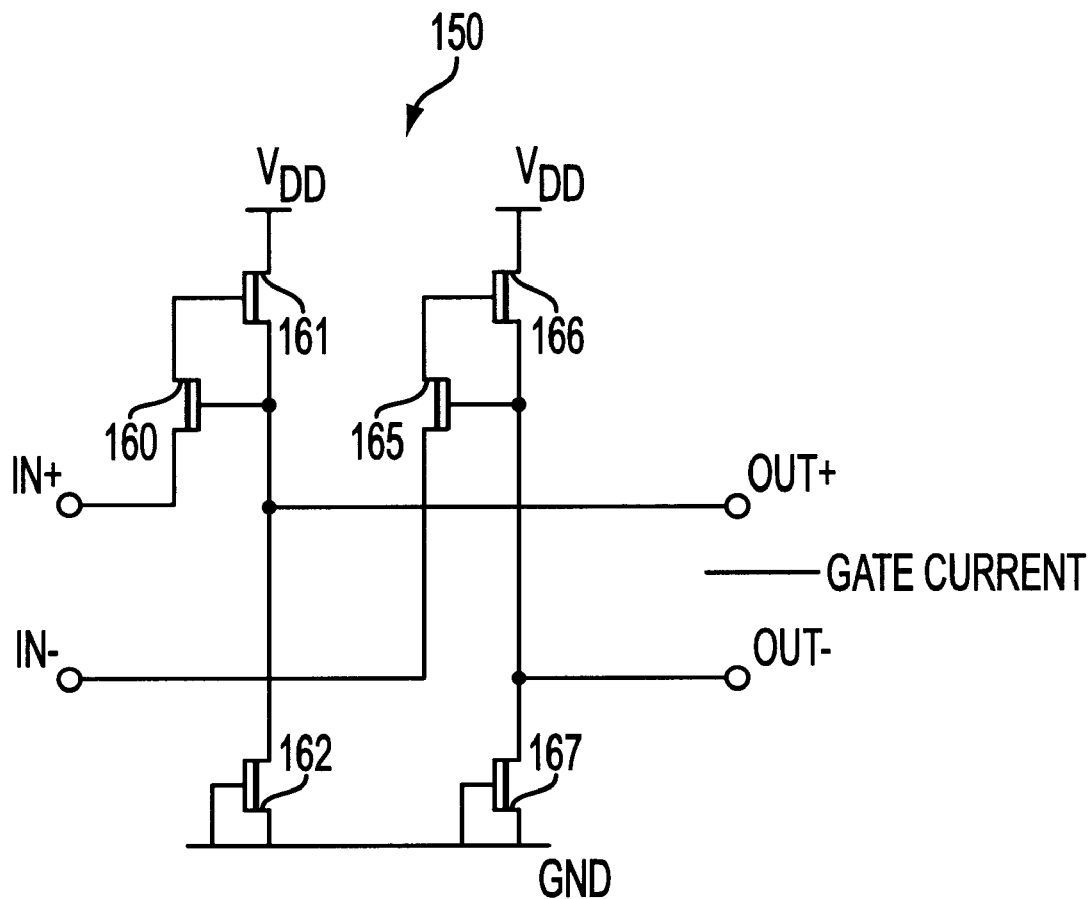
FIG. 27 is a specific circuit diagram of an input buffer 150.

FIG. 27 is a specific circuit diagram of this input buffer 150. In this circuit, an input terminal In+ is connected to an output terminal Out via depletion type transistors 160 and 161. The transistor 162 is a current source. Likewise, depletion type transistors 165, 166 and 167 are provided for an inverting input terminal In−. In this input buffer circuit 150, a variation in voltage at the input terminal In is transmitted as it is to the output terminal Out. Note that while the gate current may flow from the output terminal Out, it will not flow through the input terminal In, so that the problem of charge leakage from the input capacitor 110 is avoided.

Returning to FIG. 26, the feedback loop of the delta AD converter in FIG. 26 is formed by a resistor r10, an amplifier 152 having a feedback circuit of a capacitor 154, and a resistor r14. Increasing the gain of the amplifier 152 provides analogously imaginary short-circuiting, and is thus suitable for the feedback loop.

Figure 28:
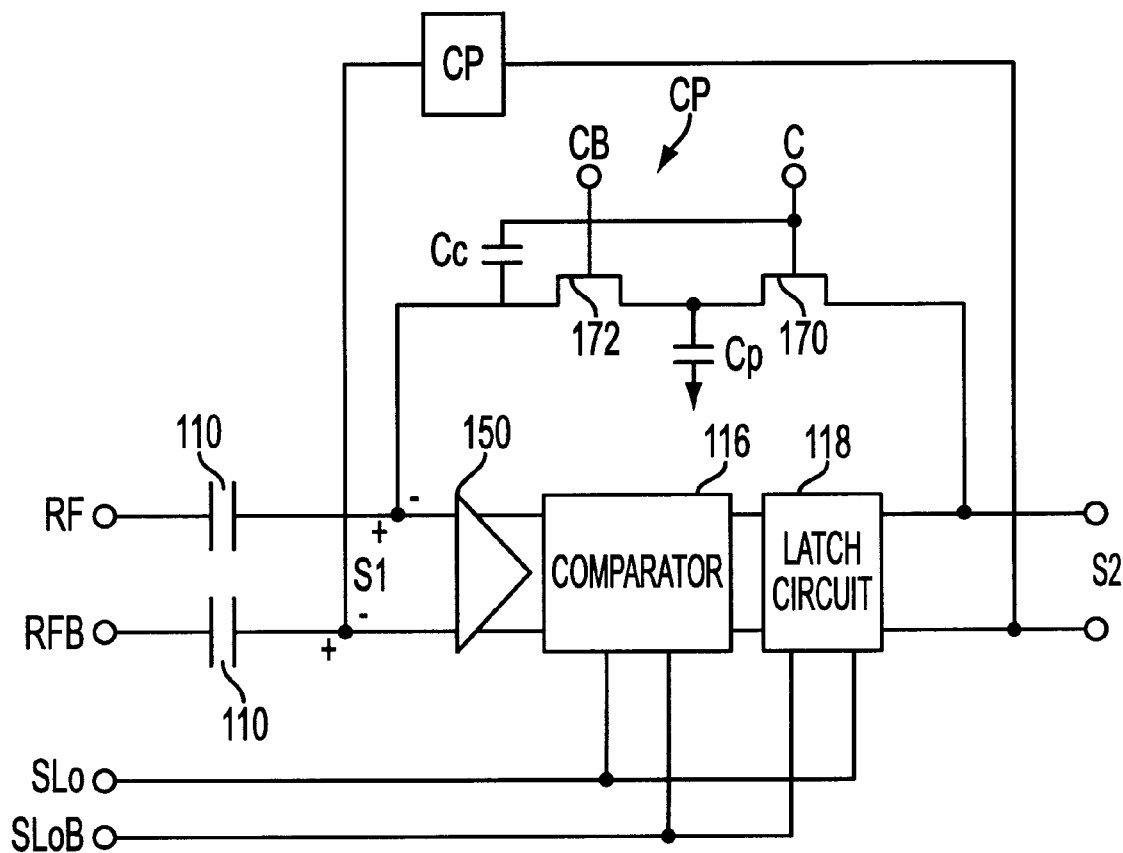
FIG. 28 is a diagram showing a further structure of the delta AD converter.

FIG. 28 is a diagram showing a further structure of the delta AD converter. In this example, the input buffer 150 is provided to prevent the gate current of the comparator 116 from causing charge leakage from the input capacitor 110 as in the example in FIG. 26. Further, a charge pump circuit CP is used in the feedback loop in the example in FIG. 28. As specifically illustrated in the diagram, this charge pump circuit CP alternately renders transistors 170 and 171 conductive by using timing signals C and CB of the opposite phases. When the output signal S2 has an H level, a capacitor Cp is charged when the transistor 170 conducts, and the charges in the capacitor Cp are transferred to the input side via a transistor 172 which will be rendered conductive later. As apparent from the above, the feedback loop shown in FIG. 28 converts a digital output to an analog value and feeds back the analog value to the input capacitor 110 on the input side.

Figure 29:
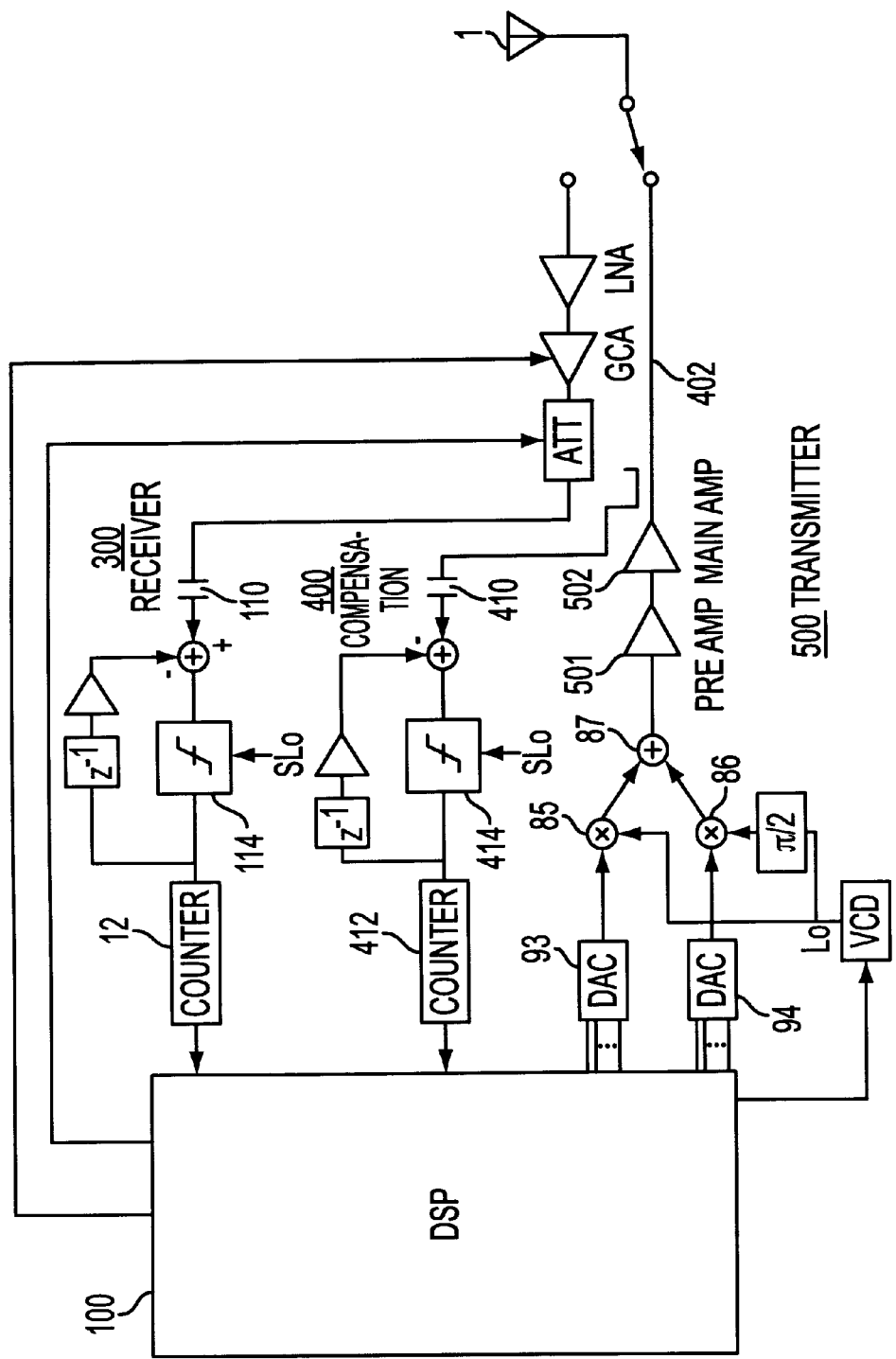
FIG. 29 is a diagram showing the structure of a transmitter/receiver according to this embodiment.

FIG. 29 is a diagram showing the structure of a transmitter/receiver according to this embodiment. This transmitter/receiver comprises a DSP 100 for generating a spreading code, a transmitting circuit 500, a receiving circuit 300, and a compensation circuit 400 which monitors and modulates a transmission signal in order to compensate for the distortion of the amplifier on the transmission end. The DSP 100 in this transmitter/receiver generates a spreading code and performs orthogonal modulation on the spreading code. This transmitter/receiver therefore generates an I component signal and Q component signal for generation of the demodulation signal SLo to be supplied to the comparator 114 in the receiving circuit 300 and an I component signal and Q component signal for generation of the demodulation signal SLo to be supplied to a comparator 414 in the compensation circuit 400, in addition to the I component signal and Q component signal that are supplied to the transmitting circuit 500. The demodulation signal generator, though not illustrated, which generates the demodulation signal SLo, is the same as the generator 262 shown in FIG. 8.

The compensation circuit 400 receives the output of the transmitting circuit 500 due to the capacitive coupling involving a coupling element 402, and detects the degree of distortion caused by a preamplifier 501 and a main amplifier 502 in the transmitting circuit 500. For this purpose, the compensation circuit 400, like the receiving circuit, has an input capacitor 410, the comparator 414 which detects the polarity of the reception signal at the phase timing of the demodulation signal SLo, its feedback circuit and a counter 412. With this structure, a signal to be transmitted is modulated directly, and the detected transmission data signal is supplied to the DSP 100. The DSP 100 detects the distortion of the amplifier from the transmission data signal, and sends the I component signal and Q component signal for compensation of the distortion to DA converters 293 and 294, respectively.

The DSP 100 compares the signal supplied from the compensation circuit 400 with the signal to be transmitted, thereby detecting an amplitude difference and a phase difference, and compensates the signal to be transmitted based on the detected differences. This compensation circuit is explained in the specification of Japanese Patent Application No. 9-241457 which was filed by the present inventor.

The receiving circuit 300 is the same as has been discussed in the foregoing description. An attenuator ATT provided on the antenna side (1) and a gain control amplifier GCA are controlled by control signals from the DSP 100. Specifically, the reception data signal detected by the receiving circuit 300 is monitored and the attenuator ATT and the gain control amplifier GCA are controlled in such a way that the optimal level is supplied to the receiving circuit 300.

As apparent from the foregoing description, this invention can significantly simplify the high-frequency circuit in the receiving apparatus, which processes a high-frequency reception signal, thus ensuring a compact and highly reliable receiving apparatus with low power dissipation and at a low cost. Particularly, this invention can directly execute code correlation and orthogonal modulation on a received high-frequency signal. Further, a compensation circuit which monitors a transmission signal can be formed easily on the transmission end by utilizing the principle of the receiving circuit.

According to this invention, a demodulator can be constituted by a delta ad converter, a latch circuit and a counter, and can be integrated using low-noise hemts or the like.

What is claimed is:

1. A receiving apparatus of a code spread communication type, comprising:

a reception unit to receive a transmitted signal;

a demodulation signal generator to perform orthogonal modulation on a spreading code assigned to a communication channel, to generate a reciprocal of a complex signal undergone said orthogonal modulation, and to multiply said reciprocal of said complex signal by a local frequency signal to generate a demodulation signal; and a first multiplier for multiplying said transmitted signal, received at said reception unit, by said demodulation signal to perform spread demodulation and orthogonal demodulation.

2. The receiving apparatus according to claim 1, wherein said demodulation signal generator comprises:

a spreading code generating section to generate said spreading code, said spreading code being in phase with a transmission side spreading code;

a serial-parallel converting section to perform serial-parallel conversion on said spreading code to convert said spreading code to a plurality of symbol points;

a reciprocal converting section to convert said complex signal, including an I component and a Q component of each of said converted symbol points, to said reciprocal of said complex signal; and a second multiplier for multiplying an I component and Q component of said reciprocal of said complex signal by said local frequency signal whose phase is shifted by π/2.

3. The receiving apparatus according to claim 2, wherein said receiving apparatus further comprises a low-pass filter having a characteristic similar to that of a filter in a transmission apparatus, said low-pass filter being inserted on an input side or an output side of said reciprocal converting section.

4. The receiving apparatus according to claim 1, wherein said local frequency signal has the same frequency as a carrier frequency of the transmitted signal.

5. The receiving apparatus according to claim 1, wherein said spreading code is a partial spreading code having a high frequency characteristic.

6. A receiving apparatus of a code spread communication type, comprising:

a reception unit to receive a spread and orthogonal modulated signal;

a demodulation signal generator to generate a reciprocal of a complex signal by performing orthogonal modulation on a spreading code assigned to a communication channel, and to multiply said reciprocal of said complex signal by a local frequency signal to generate a demodulation signal; and a multiplier to multiply said received signal by said demodulation signal to generate spread demodulation and orthogonal demodulation of said received signal.

7. The receiving apparatus of claim 6, wherein said local frequency signal corresponds to a carrier frequency signal of said received signal.

* * * * *